(12) United States Patent
Moeglein et al.

(10) Patent No.: US 8,532,567 B2
(45) Date of Patent: *Sep. 10, 2013

(54) METHOD AND APPARATUS FOR CREATING AND USING A BASE STATION ALMANAC FOR POSITION DETERMINATION

(75) Inventors: Mark Moeglein, Ashland, OR (US); Wyatt Riley, King of Prussia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1603 days.

This patent is subject to a terminal disclaimer.

(21) Appl. No.: 11/501,433

(22) Filed: Aug. 8, 2006

(65) Prior Publication Data

US 2006/0276202 A1  Dec. 7, 2006

Related U.S. Application Data

(62) Division of application No. 10/765,231, filed on Jan. 26, 2004, now Pat. No. 7,123,928.

(60) Provisional application No. 60/489,038, filed on Jul. 21, 2003.

(51) Int. Cl.
   *H04B 7/185* (2006.01)

(52) U.S. Cl.
   USPC . 455/13.3; 455/12.1; 455/562.1; 342/357.21; 342/357.22

(58) Field of Classification Search
   USPC .......... 455/456.1, 456.2, 456.3, 456.5, 412.1, 455/414.1, 414.2, 440, 446, 404.2, 13.1, 455/432.3, 461, 13.3, 562.1; 342/450, 457, 342/459, 357.01, 357.1, 385, 357.09
   See application file for complete search history.

(56) References Cited

U.S. PATENT DOCUMENTS

| 4,112,421 A | 9/1978 | Freeny, Jr. |
| 4,567,483 A | 1/1986 | Bateman et al. |

(Continued)

FOREIGN PATENT DOCUMENTS

| EP | 0930514 A2 | 7/1999 |
| EP | 1008862 A1 | 6/2000 |

(Continued)

OTHER PUBLICATIONS

Biacs et al. "The Qualcomm/Snaptrack Wireless-Assisted GPS Hybrid Positioning System and Results from Initial Commercial Deployments" Proceedings of the Institute of Navigation, ION GPS 2002, Online, Sep. 24, 2002, pp. 378-384.

(Continued)

*Primary Examiner* — Jean Gelin
(74) *Attorney, Agent, or Firm* — Thien T. Nguyen

(57) ABSTRACT

A method and apparatus for creating and using a base station almanac for position determination is described. The base station almanac includes a number of records, where each record can describe a sector or a transmitter (e.g., a base station or a repeater) in a wireless communication network. Each record includes a protocol type field that indicates the one or more protocols supported by the record (e.g., IS-801, J-STD-36, GSM, W-CDMA, and so on). Each record also includes a unique sector identifier for the sector/transmitter for each supported protocol, where each identifier is defined based on the associated protocol. A record may also include multiple maximum antenna ranges (MARs), where each MAR is associated with a respective reference power level. One of the multiple MARs can be selected for use for position determination depending on received signal strength. The base station almanac further includes other features.

24 Claims, 7 Drawing Sheets

(56) References Cited

U.S. PATENT DOCUMENTS

| | | |
|---|---|---|
| 5,075,693 A | 12/1991 | McMillan et al. |
| 5,515,419 A | 5/1996 | Sheffer |
| 5,537,460 A | 7/1996 | Holliday, Jr. et al. |
| 5,570,412 A | 10/1996 | LeBlanc |
| 5,588,848 A | 12/1996 | Law et al. |
| 5,608,410 A | 3/1997 | Stilp et al. |
| 5,613,205 A | 3/1997 | Dufour |
| 5,657,487 A | 8/1997 | Doner |
| 5,706,333 A | 1/1998 | Grenning et al. |
| 5,717,406 A | 2/1998 | Sanderford et al. |
| 5,731,786 A * | 3/1998 | Abraham et al. ........ 342/357.25 |
| 5,736,957 A | 4/1998 | Raney |
| 5,812,087 A | 9/1998 | Krasner |
| 5,841,396 A | 11/1998 | Krasner |
| 5,873,040 A | 2/1999 | Dunn et al. |
| 5,874,914 A | 2/1999 | Krasner |
| 5,883,598 A | 3/1999 | Parl et al. |
| 5,945,944 A | 8/1999 | Krasner |
| 5,960,341 A * | 9/1999 | LeBlanc et al. ............ 455/426.1 |
| 5,969,669 A | 10/1999 | Ishikawa et al. |
| 5,987,306 A | 11/1999 | Nilsen et al. |
| 5,999,124 A | 12/1999 | Sheynblat |
| 6,014,102 A | 1/2000 | Mitzlaff et al. |
| 6,061,018 A | 5/2000 | Sheynblat |
| 6,122,266 A | 9/2000 | Lynch |
| 6,128,501 A | 10/2000 | Ffoulkes-Jones |
| 6,161,018 A | 12/2000 | Reed et al. |
| 6,166,685 A * | 12/2000 | Soliman .................... 342/357.29 |
| 6,167,275 A | 12/2000 | Oros et al. |
| 6,175,500 B1 | 1/2001 | Roy |
| 6,188,354 B1 | 2/2001 | Soliman et al. |
| 6,208,290 B1 | 3/2001 | Krasner |
| 6,215,441 B1 | 4/2001 | Moeglein et al. |
| 6,215,442 B1 | 4/2001 | Sheynblat et al. |
| 6,216,064 B1 | 4/2001 | Johnson et al. |
| 6,222,483 B1 | 4/2001 | Twitchell et al. |
| 6,230,018 B1 | 5/2001 | Watters et al. |
| 6,236,365 B1 | 5/2001 | LeBlanc et al. |
| 6,243,587 B1 | 6/2001 | Dent et al. |
| 6,243,591 B1 | 6/2001 | Takemura |
| 6,246,861 B1 | 6/2001 | Messier et al. |
| 6,249,252 B1 | 6/2001 | Dupray |
| 6,263,208 B1 | 7/2001 | Chang et al. |
| 6,275,707 B1 | 8/2001 | Reed et al. |
| 6,313,786 B1 | 11/2001 | Sheynblat et al. |
| 6,313,787 B1 | 11/2001 | King et al. |
| 6,314,294 B1 | 11/2001 | Benveniste |
| 6,330,628 B1 | 12/2001 | Motoyama |
| 6,353,412 B1 | 3/2002 | Soliman |
| 6,362,778 B2 | 3/2002 | Neher |
| 6,393,294 B1 | 5/2002 | Perez-Breva et al. |
| 6,433,735 B1 | 8/2002 | Bloebaum et al. |
| 6,445,927 B1 | 9/2002 | King et al. |
| 6,466,797 B1 | 10/2002 | Frodigh et al. |
| 6,466,938 B1 * | 10/2002 | Goldberg .............................. 1/1 |
| 6,490,313 B1 | 12/2002 | Ganesh et al. |
| 6,501,955 B1 | 12/2002 | Durrant et al. |
| 6,526,039 B1 | 2/2003 | Dahlman et al. |
| 6,529,164 B1 | 3/2003 | Carter |
| 6,538,601 B2 | 3/2003 | Bruno et al. |
| 6,556,829 B1 | 4/2003 | Persson |
| 6,590,530 B2 | 7/2003 | Van Diggelen et al. |
| 6,603,966 B1 | 8/2003 | Sheffield |
| 6,628,944 B1 * | 9/2003 | Jeong et al. .................... 455/433 |
| 6,636,740 B1 | 10/2003 | Ramesh |
| 6,636,744 B1 | 10/2003 | Da |
| 6,684,158 B1 | 1/2004 | Garin et al. |
| 6,707,422 B2 | 3/2004 | Sheynblat et al. |
| 6,754,470 B2 | 6/2004 | Hendrickson et al. |
| 6,757,544 B2 * | 6/2004 | Rangarajan et al. ........ 455/456.1 |
| 6,799,050 B1 | 9/2004 | Krasner |
| 6,799,054 B2 | 9/2004 | Shpak |
| 6,806,830 B2 | 10/2004 | Panasik et al. |
| 6,865,395 B2 | 3/2005 | Riley |
| 6,895,249 B2 | 5/2005 | Gaal |
| 6,898,197 B1 | 5/2005 | Lavean |
| 6,957,072 B2 | 10/2005 | Kangras et al. |
| 6,970,795 B1 | 11/2005 | Burgett et al. |
| 7,065,351 B2 | 6/2006 | Carter et al. |
| 7,072,316 B2 | 7/2006 | Proctor, Jr. et al. |
| 7,084,809 B2 | 8/2006 | Hockley, Jr. et al. |
| 7,123,928 B2 | 10/2006 | Moeglein et al. |
| 7,127,257 B2 | 10/2006 | Riley et al. |
| 7,203,497 B2 | 4/2007 | Belcea |
| 7,209,758 B1 | 4/2007 | Moll et al. |
| 7,239,272 B2 | 7/2007 | Vyas et al. |
| 7,286,515 B2 | 10/2007 | Olson et al. |
| 7,363,028 B2 | 4/2008 | De Clerq et al. |
| 7,383,049 B2 | 6/2008 | Deloach, Jr. et al. |
| 7,558,852 B2 | 7/2009 | Douglas et al. |
| 7,660,588 B2 | 2/2010 | Sheynblat et al. |
| 7,751,829 B2 | 7/2010 | Masuoka et al. |
| 7,821,986 B2 | 10/2010 | Thomson et al. |
| 7,936,736 B2 | 5/2011 | Proctor, Jr. et al. |
| 8,144,673 B2 | 3/2012 | Alizadeh-Shabdiz |
| 8,150,421 B2 | 4/2012 | Ward et al. |
| 8,204,512 B2 | 6/2012 | Dietrich et al. |
| 8,244,274 B2 | 8/2012 | Grigsby et al. |
| 2001/0022558 A1 | 9/2001 | Karr, Jr. et al. |
| 2001/0034223 A1 | 10/2001 | Rieser et al. |
| 2001/0041566 A1 | 11/2001 | Xanthos et al. |
| 2002/0022482 A1 | 2/2002 | Ishikawa |
| 2002/0025822 A1 | 2/2002 | Hunzinger |
| 2002/0065107 A1 | 5/2002 | Harel et al. |
| 2002/0076951 A1 | 6/2002 | Roy |
| 2002/0076952 A1 | 6/2002 | Roy |
| 2002/0076958 A1 | 6/2002 | Roy et al. |
| 2002/0095486 A1 | 7/2002 | Bahl |
| 2002/0111171 A1 | 8/2002 | Boesch et al. |
| 2002/0131255 A1 | 9/2002 | Roy |
| 2002/0137404 A1 | 9/2002 | Roy |
| 2002/0175855 A1 | 11/2002 | Richton et al. |
| 2002/0193946 A1 | 12/2002 | Turnbull |
| 2003/0007468 A1 | 1/2003 | Joshi et al. |
| 2003/0040331 A1 | 2/2003 | Zhao |
| 2003/0048758 A1 | 3/2003 | Jones et al. |
| 2003/0068977 A1 | 4/2003 | King |
| 2003/0083064 A1 | 5/2003 | Cooper |
| 2003/0095527 A1 | 5/2003 | Shanbhag |
| 2003/0100313 A1 | 5/2003 | Ogino et al. |
| 2003/0125045 A1 | 7/2003 | Riley et al. |
| 2003/0129987 A1 | 7/2003 | Tanay et al. |
| 2003/0134648 A1 * | 7/2003 | Reed et al. ..................... 455/456 |
| 2003/0190919 A1 | 10/2003 | Niemenmaa |
| 2003/0195008 A1 | 10/2003 | Mohi et al. |
| 2004/0034471 A1 | 2/2004 | Rorabaugh |
| 2004/0110518 A1 | 6/2004 | Swift et al. |
| 2004/0180670 A1 | 9/2004 | Pande et al. |
| 2004/0203727 A1 | 10/2004 | Abiri et al. |
| 2004/0263386 A1 | 12/2004 | King et al. |
| 2005/0070304 A1 | 3/2005 | Farchmin et al. |
| 2005/0090266 A1 * | 4/2005 | Sheynblat ................. 455/456.1 |
| 2005/0113107 A1 | 5/2005 | Meunier |
| 2006/0030290 A1 | 2/2006 | Rudolf et al. |
| 2006/0211431 A1 | 9/2006 | Mansour et al. |
| 2006/0232466 A1 | 10/2006 | Park et al. |
| 2007/0042790 A1 * | 2/2007 | Mohi et al. .................. 455/456.5 |
| 2007/0053474 A1 | 3/2007 | Kim |
| 2007/0139267 A1 | 6/2007 | Black et al. |
| 2007/0258421 A1 | 11/2007 | Alizadeh-Shabdiz et al. |
| 2008/0008118 A1 | 1/2008 | Alizadeh-Shabdiz |
| 2008/0032706 A1 | 2/2008 | Sheynblat et al. |
| 2008/0096579 A1 | 4/2008 | Gill |
| 2008/0242312 A1 | 10/2008 | Paulson et al. |
| 2008/0280624 A1 | 11/2008 | Wrappe |
| 2008/0294334 A1 | 11/2008 | Jo et al. |
| 2009/0146870 A1 | 6/2009 | Thome et al. |
| 2009/0225743 A1 | 9/2009 | Nicholls et al. |
| 2010/0073229 A1 | 3/2010 | Pattabiraman et al. |
| 2010/0093377 A1 | 4/2010 | Riley et al. |
| 2010/0099375 A1 | 4/2010 | Rowitch |
| 2011/0028166 A1 | 2/2011 | Ketchum et al. |
| 2011/0263219 A1 | 10/2011 | Hasenfang et al. |

FOREIGN PATENT DOCUMENTS

| | | |
|---|---|---|
| EP | 1122554 A1 | 8/2001 |
| EP | 2015535 A1 | 1/2009 |
| GB | 2364617 | 1/2002 |
| JP | 5336564 A | 12/1993 |
| JP | 8237729 A | 9/1996 |
| JP | 9261159 A | 10/1997 |
| JP | 1070752 | 3/1998 |
| JP | 2001112050 A | 4/2001 |
| JP | 2002152104 | 5/2002 |
| JP | 2002518684 A | 6/2002 |
| JP | 2002300100 A | 10/2002 |
| JP | 2003296152 A | 10/2003 |
| JP | 2004166056 A | 6/2004 |
| JP | 2005020053 A | 1/2005 |
| JP | 2005535901 T | 11/2005 |
| JP | 2007506099 A | 3/2007 |
| JP | 2008501260 A | 1/2008 |
| KR | 1020050050641 | 5/2005 |
| WO | 9603679 A1 | 2/1996 |
| WO | WO9631076 | 10/1996 |
| WO | WO9642179 A1 | 12/1996 |
| WO | 9705722 A2 | 2/1997 |
| WO | WO9944375 A1 | 9/1999 |
| WO | WO0038460 A1 | 6/2000 |
| WO | WO0133302 | 5/2001 |
| WO | 0150151 A1 | 7/2001 |
| WO | WO0173466 A1 | 10/2001 |
| WO | WO0184862 | 11/2001 |
| WO | WO0199444 A1 | 12/2001 |
| WO | WO0223215 | 3/2002 |
| WO | WO0251192 A1 | 6/2002 |
| WO | WO03010552 A2 | 2/2003 |
| WO | 03/019835 | 3/2003 |
| WO | 03/058986 | 7/2003 |
| WO | 2004102865 A1 | 11/2004 |
| WO | 2008016901 A2 | 2/2008 |
| WO | 2009017877 | 2/2009 |

OTHER PUBLICATIONS

International Search Report, PCT/US2004/023577, International Search Authority/EPO, Aug. 26, 2004 (2 pages).

TIA/EIA/IS-801-1, "Position Determination Service Standard for Dual Mode Spread Spectrum Systems, Addendum 1" 3GPP2 C.S0022-0-1, Publication Version, Feb. 16, 2001.

TIA/EIA J-STD-036-A, "Enhanced Wireless 9 1 1, Phase 2", TIA: Published Jun. 2002.

GSM 04.31, V8.1.0 (Apr. 2000), Digital Cellular Telecommunications System (Phase 2+); Location Services (LCS); Mobile Station (MS)—Serving Mobile Location Centre (SMLC) Radio Resource LCS Protocol (RRLP) (GSM 04.31 version 8.1.0 Release 1999).

TIA/EIA/IS-95,."Mobile Station-Base Station Compatibility Standard for Dual-Mode Wideband Spread Spectrum Cellular System," Jul. 1993.

TIA/EIA/IS-95B, "Mobile Station-Base Station Compatibility Standard for Wideband Spread Spectrum Cellular Systems," Mar. 1999.

TIA/EIA/IS-2000-1) Introduction to cdma2000 Standards for Spread Spectrum Systems; 2) Physical Layer Standard for cdma2000 Spread Spectrum Systems; 3) Medium Access Control (MAC) Standard for cdma2000 Spread Spectrum Systems; 4) Signaling Link Access Control (LAC) Standard for cdma2000 Spread Spectrum Systems; 5) Upper Layer (Layer 3) Signaling Standard for cdma2000 Spread Spectrum Systems; 6) Analog Signaling Standard for cdma2000 Spread Spectrum Systems (V.1.0, Release C, May 28, 2002).

Savarese C et al: "Locationing in distributed ad-hoc wireless sensor networks" 2001 IEEE International Conference on Acoustics, Speech, and Signal Processing. Proceedings. (Icassp). Salt Lake City, UT, May 7 - 11,2001, IEEE International Conference on Acoustics, Speech, and Signal.

Processing (ICASSP), New York, NY: IEEE, US, vol. 4 of 6, (May 7, 2001), pp. 2037-2040, XP002225743 ISBN: 0-7803-7041-4.

Written Opinion—PCT/US2004/023577, International Searching Authority—European Patent Office, Aug. 26, 2004.

3GPP2 C.S0010-C. "Recommended Minimum Performance Standards for cdma2000 Spread Spectrum Base Stations," version 1.0, Release C, Jan. 14, 2005.

3GPP2 C.S0010-C. "Recommended Minimum Performance Standards for cdma2000 Spread Spectrum Base Stations," version 2.0, Release C, Feb. 24, 2006.

TIA/856-A; "CDMA2000 High Rate Packet Data Air Interface Specification" (Apr. 2004).

* cited by examiner

METHOD AND APPARATUS FOR CREATING AND USING A BASE STATION ALMANAC FOR POSITION DETERMINATION

RELATED APPLICATIONS

This application is a divisional of U.S. patent application Ser. No. 10/765,231, filed on Jan. 26, 2004 now U.S. Pat. No. 7,123,928, which also claims priority to U.S. Provisional Application No. 60/489,038, filed on Jul. 21, 2003.

BACKGROUND

1. Field

The present invention relates generally to position determination, and more specifically to a method and apparatus for creating and using a base station almanac (BSA) for position determination.

2. Background

It is often desirable, and sometimes necessary, to know the position of a wireless user. For example, the Federal Communications Commission (FCC) has adopted a report and order for an enhanced 911 (E-911) wireless service that requires the position of a wireless terminal (e.g., a cellular phone) to be provided to a Public Safety Answering Point (PSAP) each time a 911 call is made from the terminal. In addition to the FCC mandate, service providers may use location services (i.e., services that identify the position of wireless terminals) in various applications to provide value-added features.

The position of a wireless terminal may be determined based on various systems. One such system is the well-known Global Positioning System (GPS), which is a "constellation" of 24 well-spaced satellites that orbit the earth. Another such system is a cellular communication system that includes a number of base stations to support communication for a number of user terminals. A position estimate (also commonly referred to as a "fix") for the terminal may be obtained based on (1) distances or ranges from the terminal to a sufficient number of transmitters (typically three or four) and (2) the locations of these transmitters. Each transmitter may correspond to a GPS satellite or an earth-bound base station in the cellular system. The range to each transmitter may be estimated based on a signal received by the terminal from the transmitter. The location of each transmitter can typically be ascertained based on the identity of the transmitter, which may also be obtained from the signal received from the transmitter.

An almanac is typically maintained for each system used for position determination. The almanac contains various types of information that are pertinent for position determination such as the identity of each transmitter in the system, the location of the transmitter, timing information for the transmitter, and so on. The almanac information may be used in various manners for position determination. For example, the locations of the transmitters in the almanac may also be used in combination with measurements (e.g., ranges) for the transmitters to derive a final position estimate for the terminal.

A wireless network operator may maintain a base station almanac for base stations and repeaters in a cellular network. The base station almanac for a Code Division Multiple Access (CDMA) network that implements IS-95 or IS-2000 standard is specified in a document TIA/EIA/IS-801-1, entitled "Position Determination Service Standards for Dual Mode Spread Spectrum Systems, Addendum 1." The base station almanac defined by IS-801 has a number of shortcomings that limit its use and compromise the quality of the position estimates obtained with the base station almanac. For example, the identifiers for the base stations are defined with parameters that are specific to IS-95 and ANSI-41 network interface. The IS-801 base station almanac thus cannot generally support other air interface protocols besides IS-801. Other limitations of the IS-801 base station almanac are described below.

There is therefore a need in the art for an improved base station almanac for position determination.

SUMMARY

A method and apparatus for creating and using an improved base station almanac for position determination is described herein. This base station almanac has various features that overcome some key limitations of the IS-801 base station almanac. For example, the improved base station almanac can support multiple protocols such as IS-801, J-STD-36, GSM, UMTS, W-CDMA, and so on, which are described below. This allows a single position determining entity (PDE) to support position determination for different protocols with the same base station almanac format and contents and the same PDE design.

The base station almanac includes a number of records, where each record can describe a sector or a transmitter (e.g., a base station or a repeater) in a wireless communication network. Each record includes a protocol type field that indicates which protocol(s) are supported by the record. Each record also includes a unique sector identifier for the sector/transmitter for each supported protocol, where each identifier is defined based on the associated protocol.

A record may also include an antenna range or coverage area descriptor, which may be expressed as a function of relative or absolute power levels. In one implementation, multiple maximum antenna ranges (MARs) may be specified, where each MAR is associated with a respective reference power level. One of the multiple MARs can be selected for use for position determination depending on the received signal strength measured by the terminal for the sector/transmitter and the reference power levels for the MARs. An estimated MAR may also be obtained using any one of the various interpolation and curve fitting techniques known in the art. Multiple MARs can improve position determination performance in various manners, as described below.

A record may also include (1) multiple frequencies used by the sector/transmitter and (2) calibration information for each frequency, multiple frequencies at a time, or all frequencies. This feature avoids duplication of data encountered in the IS-801 base station almanac, which requires a new record to be stored for each frequency even though most of the other data for the sector/transmitter may be the same for all frequencies.

A record for a repeater may include various types of information that may be used for position determination such as a watermark ID for the repeater, the repeater type (e.g., "wired" or "over-the-air"), and so on, as described below.

Other features of the improved base station almanac are described below. Various aspects and embodiments of the disclosed method and apparatus are also described below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. Moreover, in the following description, "location" and "position" are synonymous terms that are used interchangeably.

Figure 1:
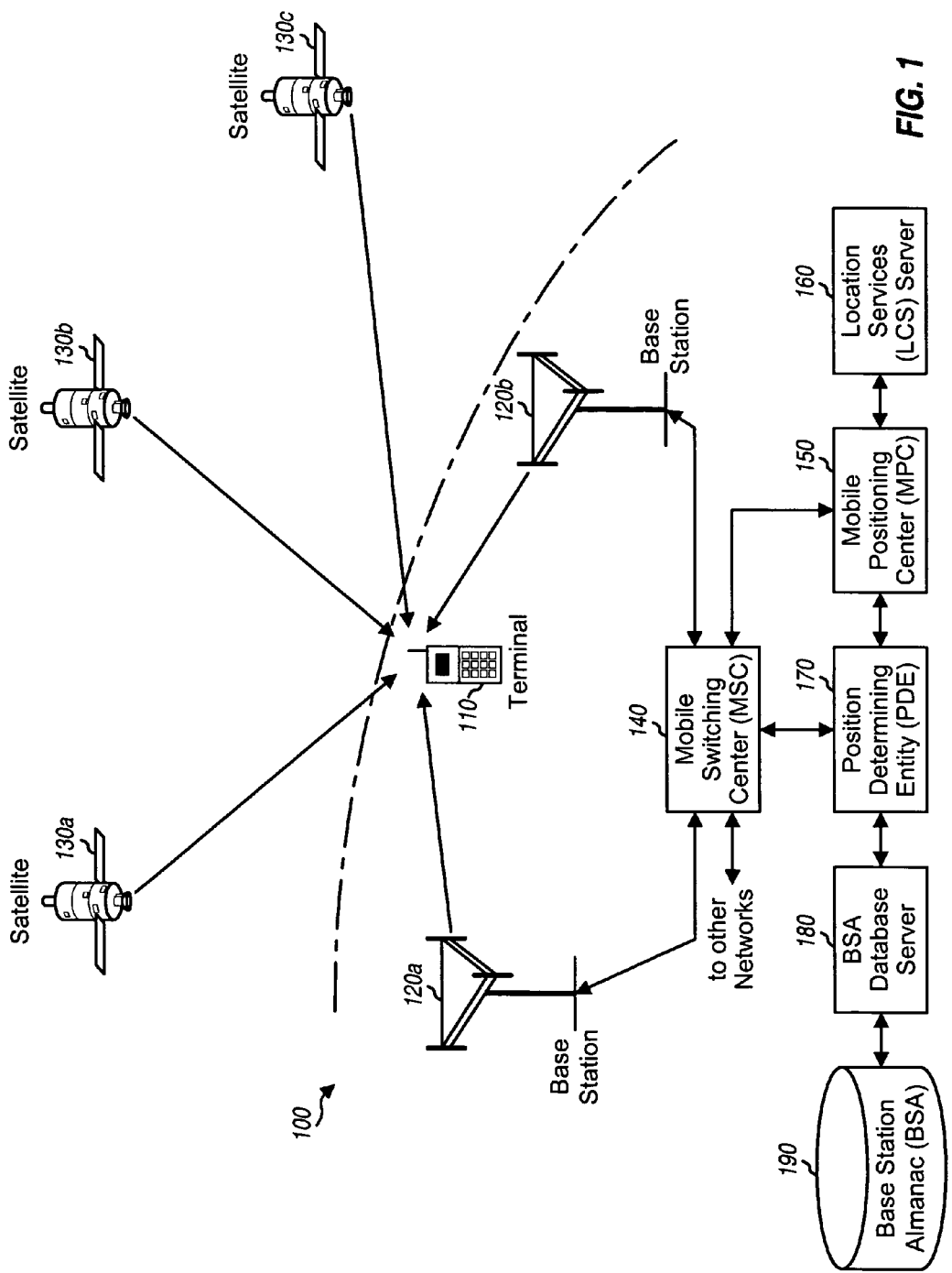
FIGS. 1 and 2 show two cellular communication networks utilizing a control plane and a user plane architecture, respectively, for supporting position determination.

FIG. 1 shows a cellular communication network 100 that supports position determination for wireless terminals. Wireless network 100 may be a CDMA network, a Time Division Multiple Access (TDMA) communication network, or some other wireless communication network. A CDMA network may implement one or more standards such as IS-95, IS-2000, a Wideband-CDMA (W-CDMA) standard such as UMTS (Universal Mobile Telecommunications System), and so on. A TDMA network may implement one or more standards such as Global System for Mobile Communications (GSM). These standards are well known in the art.

Wireless network 100 includes base stations that provide communication for wireless terminals. For simplicity, only two base stations 120a and 120b and one wireless terminal 110 are shown in FIG. 1. A base station is a fixed station and may also be referred to as a Node B, an access point, or some other terminology. A wireless terminal may be fixed or mobile and may also be referred to as a mobile station (MS), a user equipment (UE), a wireless communication device, or some other terminology. A mobile switching center (MSC) 140 couples to base stations 120 and may further couple to other systems and networks, such as a public switched telephone network (PSTN), a packet data serving node (PDSN), and so on. MSC 140 provides coordination and control for the base stations coupled to it and further controls the routing of data to/from the terminals served by these base stations.

Wireless network 100 utilizes a control plane architecture for supporting position determination. For this architecture, a mobile positioning center (MPC) 150 couples to MSC 140, a location services (LCS) server 160, and a PDE 170. MPC 150 manages location applications and exchanges location data with external data networks. LCS server 160 provides location services to end applications that use or rely on location information for terminals. PDE 170 couples to MSC 140, MPC 150, and a BSA database server 180. PDE 170 collects and formats location data, provides assistance to terminals for position determination, and may perform computations to obtain position estimates for the terminals. BSA database server 180 manages a BSA database 190, which stores a base station almanac for wireless network 100. The network entities in wireless network 100 (MSC 140, MPC 150, LCS server 160, PDE 170, and server 180) may communicate with each other via messages defined by TIA/EIA/IS-801, J-STD-36, or some other network protocol. For the control plane architecture, the network messages are encapsulated in signaling messages (e.g., Data Burst message) that are specific to the wireless network.

Figure 2:
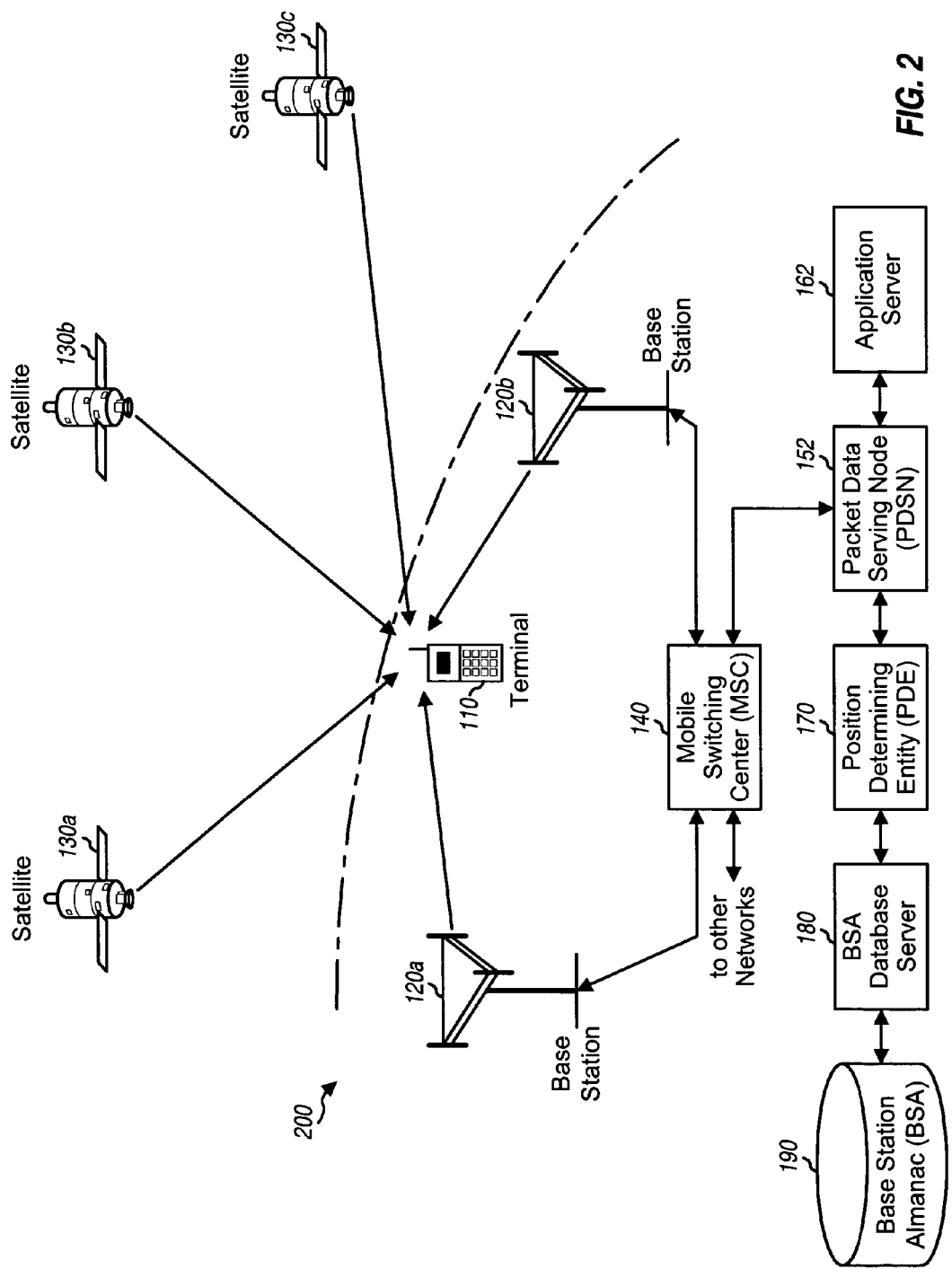

FIG. 2 shows a wireless communication network 200 that utilizes a user plane architecture for supporting position determination. For this architecture, an Interworking Function (IWF)/PDSN 152 couples to MSC 140, PDE 170, and an application server 162. IWF/PDSN 152 supports communication for the network entities coupled to it. Application server 162 supports end applications that use or rely on location information for terminals. PDE 170 communicates with MSC 140 and application server 162 to support position determination. The network entities in wireless network 200 may communicate with each other via network messages (e.g., IS-801 and J-STD-36). For the user plane architecture, the network messages may be transported using Transmission Control Protocol (TCP), Internet Protocol (IP), and/or other well-known networking protocols.

For both wireless networks 100 and 200, each base station provides communication coverage for a respective geographic area. The term "cell" can refer to a base station and/or its coverage area, depending on the context in which the term is used. To increase system capacity, the coverage area of each base station may be partitioned into multiple (e.g., three) sectors. Each sector may be served by a corresponding base transceiver subsystem (BTS). For a sectorized cell, the base station for that cell typically includes all of the BTSs for the sectors of that cell. The term "sector" can refer to a BTS and/or its coverage area, depending on the context in which the term is used. For simplicity, in the following description, the term "base station" is used generically for both a fixed station that serves a cell and a fixed station that serves a sector.

As shown in FIGS. 1 and 2, wireless terminal 110 may receive signals transmitted from a number of transmitters, each of which may be a base station 120 or a GPS satellite 130. The position of terminal 110 may be determined based on measurements obtained for one or multiple systems (e.g., GPS and/or cellular system). Table 1 summarizes various position determination methods that may be used to derive a position estimate for the terminal, in descending order of accuracy.

TABLE 1

Position Determination Methods

| Method | Description |
| --- | --- |
| GPS | Position fix based solely on GPS measurements. Highest accuracy. May not be available for certain environments (e.g., indoors). |
| Hybrid | Position fix based on a combination of GPS and cellular measurements. Intermediate accuracy. Improved indoor availability. |
| A-FLT | Position fix based solely on cellular measurements. Reduced accuracy. Commonly available in urban area and may be available where GPS is not available (e.g., indoors). |
| Enhanced Cell-ID | Position fix based solely on cellular measurements. Low accuracy. Generally depends on the sector size and the accuracy of timing and/or signal strength measurements. |
| Cell-ID | Position fix based solely on a cellular measurement. Lowest accuracy. Provides only the identity of the cell where the terminal is located. Accuracy is dependent on the size of the cell. |

A GPS measurement is a measurement obtained from a signal received by a terminal from a GPS satellite or some other type of satellite. The GPS measurement may be converted to a pseudo-range between the terminal and the GPS satellite. A cellular measurement (or base station measurement) is a measurement obtained from a signal received by the terminal from a base station. The cellular measurement may also be converted to a pseudo-range between the terminal and the base station. A pseudo-range (and not a range) is obtained for a measurement because of timing uncertainty associated with the measurement.

Advanced Forward Link Trilateration (A-FLT) is a technique for determining the position of a terminal based solely on cellular measurements. Uplink Time of Arrival (U-TOA), Enhanced Observed Time Difference (E-OTD), and Observed Time Difference of Arrival (OTDOA) are techniques equivalent to A-FLT.

Typically, the best available position determination method (e.g., among the ones shown in Table 1) is used whenever a position estimate is needed for a wireless terminal. A given method can be used if the number of measurements required by that method is available. If fewer than the required number of measurements is available, then a fallback or safety-net fix such as a cell-ID or enhanced cell-ID fix may be provided.

The base station almanac may be used to support all of the position determination methods shown in Table 1. For the GPS method, an initial position estimate may be obtained for a terminal based on one or more cellular measurements and the base station almanac. The initial position estimate is then used to provide aiding information for the terminal. The terminal uses the aiding information to more quickly search for satellites and/or to process the signals from the satellites in a manner to achieve higher sensitivity. For all of the other position determination methods, the information in the base station almanac may be used to compute a position estimate for the terminal.

The base station almanac may be designed to support various protocols for position determination. These protocols may include IS-801, J-STD-36, and GSM 04.31 Radio Resource LCS Protocol (RRLP). IS-801 is an air-interface protocol for position determination in IS-95 and IS-2000. J-STD-36 covers ANSI-41 network protocol and IS-801 air-interface protocol and is described in a document TIAIEIA J-STD-036-A, entitled "Wireless Enhanced Emergency Services, Phase II." Position determination for GSM and W-CDMA is described in a document GSM 04.31, entitled "Digital Cellular Telecommunications System (Phase 2+); Location Services (LCS); Mobile Station (MS)—Serving Mobile Location Centre (SMLC) Radio Resource LCS Protocol (RRLP)." All of these documents are publicly available.

The base station almanac contains a number of records. A BSA record may describe a sector, a base station, or one or more repeaters. One or more BSA records may be provided for a "repeated" sector, which is a sector with at least one repeater. A BSA record contains a number of fields for various types of information that may be pertinent for position determination. Table 2 shows an embodiment of the fields for a BSA record.

TABLE 2

Base Station Almanac (BSA) Record

| Item | Field Name/Group | Description | Type/Length |
|---|---|---|---|
| 1 | Format Type | Format type for the record | UCHAR |
| 2 | Num Protocols | Number of protocols supported by the record | UCHAR |
| 3 | Protocol Type | Protocol(s) supported by the record | UCHAR |
| 4 | Sector Name | Name of the sector | Variable |
| 5 | Unique Sector Identification | The unique ID(s) for the sector | 8-byte field |
| 6 | Antenna Position Information | Information for the sector antenna position | 20-byte field |
| 7 | Antenna Orientation | Orientation of the sector antenna | INT2 |
| 8 | Antenna Opening | Opening of the sector antenna | UINT2 |
| 9 | Maximum Antenna Range Information | Information for the maximum antenna range (MAR) for the sector antenna | 4-byte field |
| 10 | Terrain Height Information | Information describing the terrain of the sector | 4-byte field |
| 11 | Repeater Flag | Repeater information | UINT2 |
| 12 | Enclosed Space Indicator | Indicate whether the sector is associated with an enclosed environment. | UCHAR |
| 13 | Time Reference | Reference time for the record | 6-byte field |
| 14 | Frequency List | List of frequencies applicable for the sector | Variable |
| 15 | Optional Fields Mask | Mask indicating which optional fields, if any, are included in the record | UINT4 |
| 16 | CDMA Transmit PN and Increment | PN offset assigned to the sector and the PN increment used for sectors | 3-byte field |
| 17 | Sector Center | Information for the sector center | 18-byte field |
| 18 | RF Link Information | Information for sector RF characteristics | 3-byte field |
| 19 | Future Expansion | Optional fields for future use | Variable |

Each of the fields in Table 2 may further include multiple subfields, multiple instances of subfields, and so on, and is described in further detail below. Table 2 also gives the type/length of each field, where UCHAR is an 8-bit unsigned character, INT2 is a 16-bit integer, UINT2 is a 16-bit unsigned integer, UINT4 is a 32-bit unsigned long integer, and a byte includes 8 bits. Table 2 shows a specific embodiment of a BSA record. In general, a BSA record may include fewer, different, and/or more fields than those shown in Table 2. Moreover, the fields and subfields of the BSA records may or may not be populated with data depending on various factors such as, for example, the availability of the data, the requirements of the system, and so on.

In one implementation, the uniqueness of a BSA record is determined by the Protocol Type field and the Unique Sector Identification field (fields 3 and 5 in Table 2). Only one record is stored in the base station almanac for each unique combination of values for these two fields. If a new record is received with fields 3 and 5 matching an existing record in the base station almanac, then the new record will be stored in place of (i.e., overwrite) the existing record. In another implementation, where specific repeater information is desired, the uniqueness of a BSA record is determined by the Protocol Type field, the Unique Sector Identification field, and the Repeater Flag field (fields 3, 5, and 11 in Table 2).

As shown in Table 2, a BSA record includes fields for various attributes that may be useful for position determination. A BSA record may also include multiple instances of a given field to store multiple data values for the associated attribute, as described below. For example, a BSA record may include multiple unique sector identifiers for the sector described by the record, multiple MARs for multiple reference power levels, multiple frequencies used by the sector, and multiple calibration values.

The Format Type field indicates the specific base station almanac version to which the BSA record conforms. A position determination system may support multiple versions of the base station almanac, and each version may be assigned a unique BSA format type to identify that version. For example, the BSA version defined by IS-801 may be assigned Format Type 0, the BSA version described in U.S. patent application Ser. No. 10/097,040, Publication No. 20030125045 A1, which is hereby incorporated by reference herein, may be assigned Format Type 1, and the BSA version described herein may be assigned Format Type 2. Each BSA version defines a specific record format with a specific set of fields for a BSA record. Since different BSA versions specify different sets of fields, the Format Type field indicates which fields are included in the BSA record. New BSA versions can be designed to be backward compatible with older BSA versions so that existing base station almanac information can be utilized.

The Num Protocol field indicates the number of protocols supported by the BSA record. This field may be omitted since the number of supported protocols may be inferred from the Protocol Type field.

The Protocol Type field indicates the specific protocol(s) supported by the BSA record. The Protocol Type field can be implemented as a bit mask where each of the protocols supported by Format Type 2 is assigned to a specific bit of the bit mask. Table 3 shows an exemplary assignment of the bits in the Protocol Type field to the supported protocols.

TABLE 3

Protocol Type Assignment

| Protocol Name | Value |
| --- | --- |
| IS-801 (CDMA) | 00000001 |
| J-STD-36 (CDMA) | 00000010 |
| GSM | 00000100 |
| W-CDMA | 00001000 |

The values in Table 3 are given in binary. The value for the Protocol Type field is the bitwise of all protocols supported by the BSA record. For example, if the BSA record supports both IS-801 and J-STD-36, then the Protocol Type value is 00000011 (binary) or 3 (decimal).

A BSA record supports a particular protocol if the sector identification information contained in the record can be matched with a message of that protocol. IS-801 is used for the Protocol Type field if the sector identification information in the BSA record can be matched with an IS-801 over-the-air message. J-STD-36 is used for the Protocol Type field if the sector identification information in the BSA record can be matched with a J-STD-36 network message. Since IS-801 and J-STD-36 may both be used to describe the same physical network, it is permissible to specify both IS-801 and J-STD-36 for the record by using a value of 00000011 (binary) for the Protocol Type field. GSM is used for the Protocol Type field if the sector identification information in the BSA record can be matched with a GSM RRLP message. W-CDMA is used for the Protocol Type field if the sector identification information in the BSA record can be matched with W-CDMA network information.

Fewer, different, and/or additional protocols may be supported by a base station almanac, and this is within the scope of the invention. Each supported protocol may be assigned to a respective bit of the Protocol Type field.

The Sector Name field contains a name for the sector. The sector name is not required and does not affect the processing of BSA information. However, a network operator or a system integrator may assign a human readable and understandable name to make data logging and debugging more efficient.

The Unique Sector Identification field contains information used to uniquely identify a sector within a wireless communication system. Each of the supported protocols (e.g., IS-801, J-STD-36, GSM, and W-CDMA) uses different vernacular to identify a sector. The BSA record includes one instance of the Unique Sector Identification field for each protocol specified in the Protocol Type field. If the BSA record supports multiple protocols, then one instance of this field is provided in the BSA record for each supported protocol and identifies the same base station using the vernacular of that protocol. The identification information for multiple protocols is provided in the same order in which the protocols appear in the Protocol Type field. For example, for Protocol Type value of 00000011, the identification information for IS-801 is provided first, followed by the identification information for J-STD-36.

In one implementation, the Unique Sector Identification field contains four subfields used to carry up to four different pieces of identification information for the sector. Table 4 lists the information carried in the four subfields for each of the protocols show in Table 3.

TABLE 4

Unique Sector Identification Field

| Subfield | IS-801 | J-STD-36 | GSM | W-CDMA | Type |
| --- | --- | --- | --- | --- | --- |
| ID1 | SID | SID or MarketID | MCC | MCC | UINT2 |
| ID2 | NID | SwitchNumber | MNC | MNC | UINT2 |
| ID3 | BaseID | BaseID | LAC | RNC-ID | UINT2 |
| ID4 | Spare | Spare | CI | CI | UINT2 |

For IS-801, a SID (System Identification) identifies a cellular system of a network operator in a specific region, and a NID (Network Identification) identifies a smaller network within the cellular system. The SID is assigned to the network operator (or "carrier"), and the NID can be used to further breakdown the networks of the carrier. The BaseID is often composed of a CELL_ID and a SECTOR_ID assigned to the sector, as reported by a terminal via over-the-air messaging. The CELL_ID and SECTOR_ID are defined by IS-95. The SID ranges from 0 through 32767, the NID ranges from 0 through 65535, the BaseID ranges from 0 through 65535, and the Spare subfield is set to 0. Since the combination of SID, NID, and BaseID is sometimes not globally unique in IS-801, the position determination processing is performed with this awareness.

For J-STD-36, the MarketID identifies a carrier market region. The SwitchNumber identifies a mobile switching center. The BaseID is often composed of the CELL_ID and SECTOR_ID, similar to the BaseID for IS-801. However, due to differences between IS-801 and J-STD-36 partitioning, the BaseID for J-STD-36 may differ from the BaseID for IS-801.

The combination of MarketID and SwitchNumber and BaseID is globally unique in J-STD-36.

For GSM, the MCC (Mobile Country Code) is a three-digit number that uniquely identifies a country, and the MNC (Mobile Network Code) is a two or three digit number that uniquely identifies a cellular network within a given MCC. The LAC (Location Area Code) uniquely identifies a LA (Location Area) within a PLMN (Public Land Mobile Network). The CI (Cell Identity) is a 16-bit identifier for a cell in GSM and UMTS. A cell in GSM and UMTS is equivalent to a sector in CDMA.

For W-CDMA, the MCC and MNC have the same format as for GSM. The RNC-ID identifies a radio network controller (RNC) in a W-CDMA network, which is equivalent to the MSC in a CDMA network.

Figure 3:
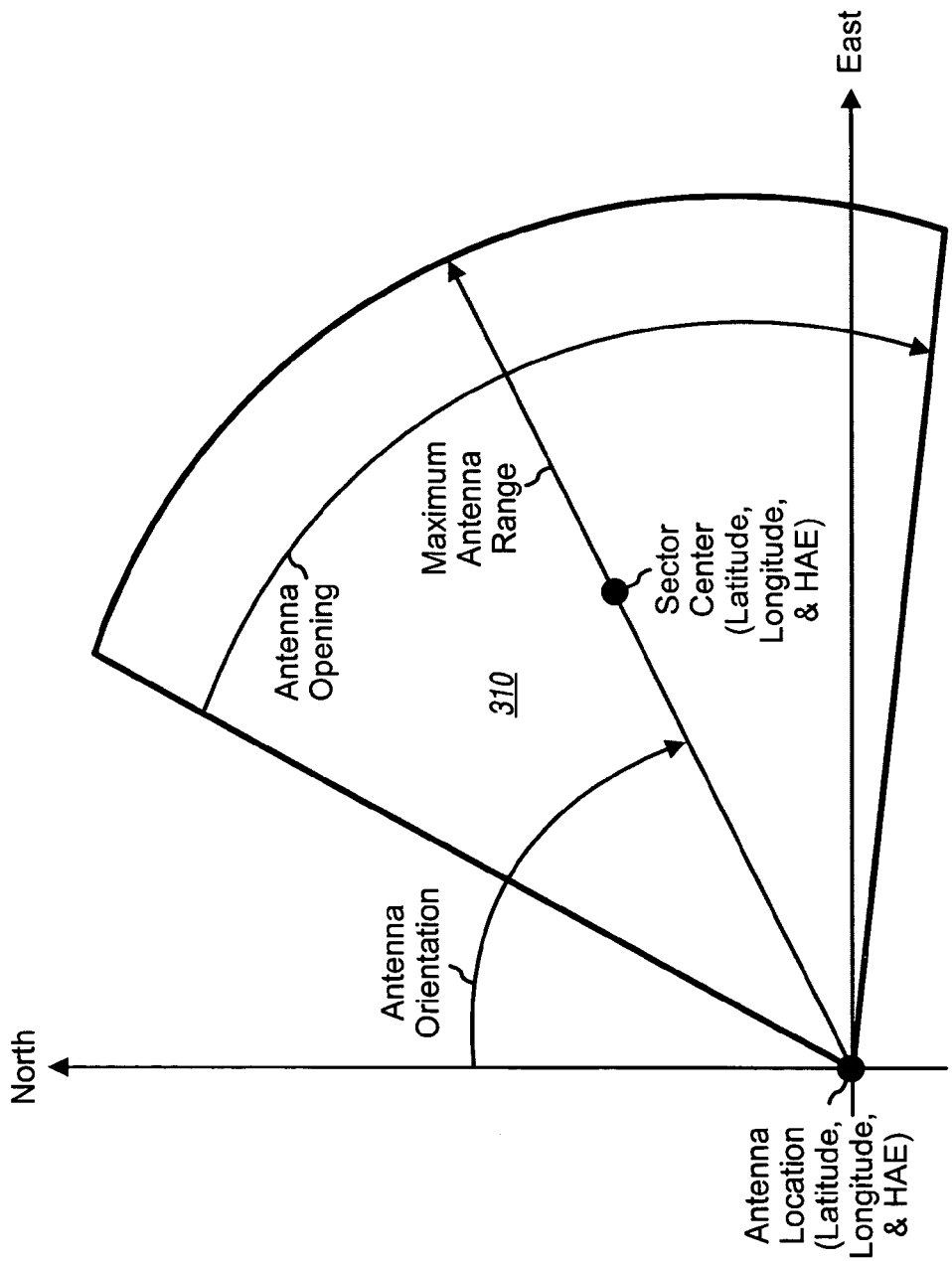
FIG. 3 shows the coverage area of an antenna for a sector.

FIG. 3 shows the coverage area of an antenna for a sector. The antenna coverage area is represented by a shaded pie-shaped area 310. The antenna location is the origin of pie-shaped area 310 and is defined by a latitude, a longitude, and a height above ellipsoid (HAE). The antenna orientation indicates the direction, with respect to North, in which the antenna is pointed, and is given in degrees from the vertical axis. The antenna opening is the angular opening for the primary RF footprint of the antenna and is given in degrees. The MAR indicates the maximum range for the antenna and may be defined as described below. The sector center is the average location of the terminals within the antenna coverage area and may be obtained empirically or computed based on attributes of the antenna, as also described below.

The Antenna Position Information field contains information describing the position of the antenna for the sector. The antenna is the origination point for the signal transmitted by a base station for the sector. Table 5 shows an embodiment of the Antenna Position Information field, which contains four subfields for latitude, longitude, altitude, and antenna position uncertainty.

TABLE 5

Antenna Position Information Field

| Subfield | Type | Range | Units |
|---|---|---|---|
| Antenna Latitude | DOUBLE | −90 to +90 | Degrees (decimal) |
| Antenna Longitude | DOUBLE | −180 to +180 | Degrees (decimal) |
| Antenna Altitude (HAE) | INT2 | −1000 to +10000 | Meters |
| Antenna Position Uncertainty (HEPE) | UINT2 | 1 to 65535 | Meters |

In Table 5, DOUBLE is a 64-bit double-precision floating-point number.

The latitude, longitude, and altitude describe the 3-dimensional (3-D) position of the antenna, where the altitude is given as a height above the WGS-84 ellipsoid (HAE). The antenna position uncertainty is given as a horizontal estimated position error (HEPE), which describes the estimated error for the antenna position in the horizontal plane. The HEPE may be defined as a 1-sigma confidence level in the 2-dimensional horizontal position of the antenna (i.e., there is 68.3% probability that the error in the antenna position in the worst-case horizontal direction is less than the HEPE). The HEPE is dependent on the method used to obtain the coordinates for the antenna position. For example, the HEPE may be set to (a) 1 meter for professional survey grade, (b) 2 meters for GPS mapping system (DGPS), (c) 5 meters for handheld GPS after May 2, 2000, and (d) 50 meters for handheld GPS before May 2, 2000. The HEPE is set to 65535 for position uncertainties of 65535 meters or greater.

The antenna position information has a large impact on the accuracy of position estimates obtained based on this information. Consequently, the latitude, longitude, and height above ellipsoid for the antenna should be as accurate as possible, e.g., with errors of less than ten meters. As one example, the antenna position is given in World Geodetic System 1984 (WGS-84), which is a standardized coordinate system based on an earth fixed global reference frame. Other datum may also be used. The Antenna Position Information field allows for larger errors in cases where only a coarse estimate of the base station location is available. Larger base station location uncertainties can cause accuracy degradation and/or processing delays.

The antenna position information may be used in various manners for position determination. First, an initial position estimate for a terminal may be obtained based in part on the antenna position, and the uncertainty in this initial position estimate may be obtained based in part on the antenna HEPE. Second, the initial position estimate may be used to provide aiding information for the terminal. Third, a final position estimate for the terminal may be obtained with the assistance of the antenna position information. For the A-FLT method, the position estimate for the terminal is obtained based solely on measurements and Antenna Position Information. For the hybrid mode, the position estimate for the terminal is obtained based on measurements and Antenna Position Information as well as measurements and locations for satellites. For both methods, the antenna position and elevation (height) have a large impact on the accuracy of the final position estimate and should thus be as accurate as possible. The final position estimate for the terminal may also be obtained using the cell-ID or enhanced cell-ID method if an insufficient number of measurements is available for trilateration.

Base station position information can substitute for antenna position information in certain instances (e.g., if antenna position information is not available). The following factors may be considered before making such substitution:

The accuracy of the base station position information;

Whether the base station position is measured directly or derived from maps;

The datum used to express the location and elevation information; and

The approximate distance from the antenna position to the base station position.

For example, the substitution may be more appropriate if the antennas for the base station are in close proximity to one another (e.g., 10 or fewer meters apart) as opposed to being located far apart (e.g., on different sides of a large building). Any inaccuracies inherent in the base station position would cause systematic degradation (or errors) in the position estimates obtained based on the base station position.

The Antenna Orientation field indicates the direction in which the antenna is pointed. The antenna orientation may be obtained from the wireless network operator or determined empirically by a site visit. As shown in FIG. 3, the antenna orientation is given clockwise from north, in units of degrees. Table 6 shows the characteristics of the Antenna Orientation field.

TABLE 6

Antenna Orientation and Antenna Opening Fields

| Field | Type | Range | Units |
|---|---|---|---|
| Antenna Orientation | INT2 | 0 to 360 | Degrees |
| Antenna Opening | UINT2 | 1 to 360 | Degrees |

The Antenna Opening field indicates the angular opening of the antenna and is related to the RF footprint of the antenna. The antenna opening may also be obtained from the wireless network operator or determined empirically by a site visit. The antenna opening is given in units of degrees, with a valid range of 1 to 360 degrees. Table 6 also shows the characteristics of the Antenna Opening field.

The maximum antenna range is a range defined such that, for 99% of the coverage area where the received power level is at a specified reference power level and the received signal quality is better than a specified signal quality (e.g., −31 dB Ec/Io), the terminal is within this range from the antenna position. The MAR may be obtained based on empirical measurements. The MAR may also be obtained by modeling, which may take into account various parameters such as antenna pattern, base station transmit power, antenna height and downtilt, reasonable assumptions for signal obstructions, and so on.

The MAR may be used to model the coverage area of the sector, which may then be used in various manners for position determination. For base station lookup, the sector coverage area is used to associate a cellular measurement for a base station with a BSA record for that base station. The MAR should be large enough such that (1) 99% of terminals receiving the signal from the base station at the specified power level are within the MAR of the base station antenna and (2) 100% of the terminals are within 2×MAR. The MAR should also be small enough such that two base stations that may be misidentified for one another (i.e., with the same PN offset and frequency for a CDMA network) should not have overlapping MARs. A properly selected MAR can provide higher success rate for base station lookup and possibly better aiding information for the terminal. The sector coverage area may also be provided as a position estimate for the terminal if a more accurate position estimate cannot be obtained from GPS and/or cellular measurements. In this case, the accuracy of the position estimate may be directly related to the MAR.

Conventionally, only one MAR is provided for each sector, and this MAR is obtained for a specific reference power level. The MAR is typically too large if the received power level is much higher than the reference power level. Conversely, the MAR is typically too small if the received power level is much lower than the reference power level.

The Maximum Antenna Range field contains one or multiple MARs, where each MAR may be associated with a respective reference power level. Multiple MARs for a single sector can provide improved performance since an appropriate MAR can be selected for use depending on the received power level. Table 7 shows an embodiment of the Maximum Antenna Range field, which can contain up to six MARs for up to six different reference power levels.

TABLE 7

Maximum Antenna Range Field

| Subfield | Type | Range | Units |
|---|---|---|---|
| NumMARs (Nm) | UCHAR | 1 to 6 | unitless |
| Nm occurrences of the following subfields | | | |
| MAR | UINT2 | 0 to 100,000 | Meters |
| ReferencePowerLevel | UCHAR | 0 to 150 | −dBm |

A network operator may store multiple MARs for multiple reference power levels for a sector. For example, three MARs may be provided for high, intermediate, and low power levels such as −55 dBm, −115 dBm, and −135 dBm, respectively. In this case, the MAR for −55 dBm is used if the received power level ($P_{rx}$) is −55 dBm or higher, the MAR for −115 dBm is used if −55 dBm>$P_{rx}$≧−115 dBm, and the MAR for −135 dBm is used if −115 dBm m>$P_{rx}$≧−135 dBm. Alternatively, the MAR to be used could be interpolated based the received power level.

Alternatively, the network operator may store one MAR at a particular reference power level (e.g., an intermediate level such as −115 dBm). This single MAR may then be scaled (1) larger if the received power level is lower than the reference power level or (2) smaller if the received power level is higher than the reference power level. The MAR scaling may be performed based on a conservative model that takes into account various parameters such as antenna pattern, base station transmit power, terrain type, antenna height and downtilt, and so on. Reasonable assumptions may be used for signal obstructions and so on.

In addition to the methods described above, MAR or coverage area may be expressed as a function of relative or absolute signal strength. Furthermore, there is a straightforward modeling process that may be used to convert MAR to coverage area radius, serving acquisition range, or some other variable describing a likely coverage area, given a relative and/or absolute signal strength measurement.

The Terrain Height Information field contains information for the terrain of the coverage area of the sector. Table 8 shows an embodiment of this field, which includes an Average Terrain Height subfield and a Terrain Height Standard Deviation subfield. The Average Terrain Height subfield indicates the average terrain height for the sector coverage area, where the average is determined based on statistics available for the coverage area and may be referenced to the WGS-84 ellipsoid. The Terrain. Height Standard Deviation subfield indicates the 1-sigma uncertainty associated with the average terrain height. The terrain height average and standard deviation values may be derived from accurate terrain elevation maps (e.g., a high quality Digital Terrain Elevation mapping database) or other direct empirical methods.

TABLE 8

Terrain Height Information Field

| Subfields | Type | Range | Units |
|---|---|---|---|
| Average Terrain Height | INT2 | −1000 to +10000 | 1 Meter |
| Terrain Height Standard Deviation | UINT2 | 1 to 10000 | 1 Meter |

Terrain information can be used as elevation aiding information and represents an additional degree of freedom available for position determination. A total of four measurements are typically needed to derive a 3-D position estimate for a terminal. These measurements may be for GPS satellites, base stations, or the surface of the earth. If the altitude in a given region is known with sufficient accuracy, then the surface of the earth can be used as one measurement, and only three additional measurements are needed to compute the 3-D position estimate. Accurate terrain information may thus be as valuable as an additional GPS or cellular measurement for position determination. Terrain information may also significantly improve yield (i.e., provide valid position estimates) in challenging environments. The absence of elevation information may negatively impact both yield and accuracy of position estimates.

The Repeater Flag field contains repeater information for the sector. A repeater receives, conditions, and retransmits signals on both the forward link (i.e., the path from the base station to the mobile unit) and reverse link (i.e., the path from the mobile unit to the base station). The Repeater Flag field may be set to 0 if the BSA record is describing a base station that does not have any repeater. The Repeater Flag field may be set to 1 if the BSA record is describing a generalized coverage area for a donor base station and all of its repeaters. For a repeated sector (i.e., a sector with repeaters), all of the information in the record is for the generalized coverage area. In particular, the sector center is the centroid of the coverage areas of all transmitters (i.e., the donor base station as well as the repeaters) and is associated with relatively large uncertainty, and the MAR(s) should encompass the coverage areas of all transmitters. Calibration values (described below) should include path delays and extra hardware. delays, and the calibration uncertainties should account for spread in the calibration values from the donor base station and all repeaters. The Repeater Flag field may be set to 2 if the BSA record is describing only the donor base station for a repeated sector. In this case, the repeaters may be described separately with one or more additional BSA records.

The Repeater Flag field may be set to a repeater ID if the BSA record is describing a specific repeater. One BSA record may be provided for each repeater for which information is available. The repeater ID is unique to the donor base station and may be defined to be within a range of 3 to 65534. The antenna location and MAR(s) in the BSA record are for the repeater being described and not the donor base station. Calibration information in the BSA record is also for the repeater and the repeater antenna and includes any transmission delays from the donor base station to the repeater. Records for individual repeaters allow the PDE to discriminate sources of signals.

The Repeater Flag field may be set to 65535 if the BSA record is describing all repeaters for a donor base station. In this case, the overall coverage area for the repeaters is described in a manner similar to the generalized coverage area but without the coverage area of the donor base station.

In general, the Repeater Flag field may indicate whether the BSA record describes a coverage area for a transmitting entity or a generalized coverage area for a plurality of transmitting entities. The transmitting entity may be a repeater, a donor base station, a base station without a repeater, and so on. The plurality of transmitting entities may be a donor base station and its repeaters, only the repeaters of the donor base station but not the donor base station, a distributed antenna system, and so on.

The Repeater Flag field and/or the Future Expansion fields may also carry other information to support repeater handling, e.g., a watermark ID and a repeater type. A watermark is a bit of modulation added by a repeater to the retransmitted signal sent to the terminals. The watermark ID is associated with the specific physical properties of the watermark, such as the frequency used for frequency modulation, and can be detected by the terminals. A terminal can send the detected watermark ID or related physical properties to the PDE for association with the watermark ID stored in the base station almanac.

The repeater type can indicate a "wired" or "over-the-air" repeater. A wired repeater is only expected to retransmit a single signal from the donor base station. In this regard, the wired repeater behaves more like a distributed antenna than a repeater. An over-the-air repeater has an antenna facing the donor base station, which can pick up the signal from the donor base station as well as signals from neighboring base stations. An over-the-air repeater can thus retransmit signals from multiple base stations. With the repeater type available in the base station almanac, the PDE can distinguish between the two repeater types and can use measurements obtained for over-the-air repeaters with knowledge that the signal may have been delayed by the repeater or come directly from the donor base station.

The base station almanac can also include other information for repeaters such as repeater feed antenna location, repeater manufacturer and model number, repeater hardware delay (similar to forward and reverse link calibration), and so on. For an over-the-air repeater, a profile of all base station signals repeated by the repeater can be stored, with relative timing (or phase) and signal strengths. The PDE may use this information to identify individual repeaters based on the "signature" of the signals received by a terminal.

The Enclosed Space Indicator field indicates whether or not the sector being described by the BSA record is isolated from other sectors and possibly GPS signals. In some environment (e.g., a tunnel), a terminal is not able to receive signals from other transmitters such as GPS satellites and base stations. In this case, no other measurements will be available to derive a position estimate for the terminal. The Enclosed Space Indicator field may be set to 0 (which is also the default value) to indicate that the terminal is not in an enclosed space. This field may be set to 1 to indicate that no other GPS and cellular signals are expected for a terminal in this sector. The Enclosed Space Indicator may be used to (1) omit the search for GPS and other cellular signals and (2) expedite the processing to obtain a position estimate. A GPS Unavailability Indicator may also be used to indicate the availability of GPS signals.

The Time Reference field indicates the time at which the BSA record was generated. This field is typically informational and not used for position determination. However, parameters in other fields of the BSA record (e.g., calibration information for GSM) may be referenced to this time. Table 9 shows an embodiment of the Time Reference field. The GPS Week subfield contains the GPS week and the GPS Seconds subfield contains the seconds within the GPS week at which the BSA record was generated, with the effects of the 1024-week rollover removed.

TABLE 9

Time Reference Field

| Subfields | Type | Range | Unit |
|---|---|---|---|
| GPS Week | UINT2 | 0 to 65535 | Weeks |
| GPS Seconds | UINT4 | 0 to 604,799,999 | Milliseconds |

For Format Type 1 base station almanac, each BSA record contains one entry for one frequency of the sector. If the sector operates on multiple frequencies, then multiple BSA records are needed for the sector, one record for each frequency. This can result in much data redundancy since the same sector information is typically replicated for all records. The BSA Format Type 2 described herein supports multiple frequencies in one BSA record, which can simplify the BSA database.

The Frequency List field contains a list of one or more frequencies on which the sector is active. Table 10 shows an embodiment of the Frequency List field.

TABLE 10

Frequency List Field

| Subfields | Type | Range |
| --- | --- | --- |
| Frequency List Length (Nf) | UCHAR | 0 to 50 |
| Frequency List | Nf × UINT2 | |
| Calibration Information | Variable | |

The Frequency List Length subfield indicates the number of frequencies (Nf) included in the Frequency List subfield (i.e., the length of frequency list). The Frequency List subfield includes one entry for each of the Nf frequencies in the list. The entry for each frequency is given using parameters defined by the protocol supported by the BSA record.

For CDMA protocols (IS-801 and J-STD-36), a frequency entry includes a combination of BAND_CLASS and CDMA_FREQ. The BAND_CLASS refers to a specific frequency band and occupies the five most significant bits (MSBs) of the frequency entry. The CDMA_FREQ refers to a specific frequency within the frequency band and occupies the eleven least significant bits (LSBs) of the frequency entry.

For GSM protocol, a frequency entry includes a combination of an absolute RF channel number (ARFCN) and a base transceiver station identity code (BSIC). The ARFCN indicates a specific RF frequency used for a broadcast control channel (BCCH) of the GSM cell and occupies the ten MSBs of the frequency entry. The BSIC identifies the transmitting base station and occupies the six LSBs of the frequency entry.

For W-CDMA protocol, a frequency entry includes a downlink channel frequency that is specified with a 14-bit value ranging from 0 to 16383.

A BSA record includes multiple instances of the Frequency List subfield if multiple protocols are supported by the BSA record, similar to the Unique Sector Identification field. One Frequency List subfield is provided for each supported protocol, and the multiple Frequency List subfield are provided in order based on the order of the protocols in the Protocol Type field.

The Calibration Information subfield contains information that accounts for timing errors for the transmitter(s) described by the BSA record. Table 11 shows an embodiment of the Calibration Information subfield. The Calibration List Type parameter may be set to 0 if one Forward Link Calibration record is provided for all Nf frequencies in the frequency list (i.e., Ncf=1). The Calibration List Type parameter may be set to 1 if one Forward Link Calibration record is provided for each of the Nf frequencies (i.e., Ncf=Nf), where the Ncf Forward Link Calibration records are provided in the same order as the Nf frequencies.

The Reverse Link Calibration Included parameter indicates whether or not the BSA record also contains reverse link calibration information. The Reverse Link Calibration Included parameter may be set to 0 if reverse link calibration information is not provided (i.e., Ncr=0) and to 1 if one Reverse Link Calibration record is provided for each Forward Link Calibration record, in which case Ncr=Ncf. The Ncr Reverse Link Calibration records are provided in the same order as the Forward Link Calibration records.

TABLE 11

Calibration Information Subfield

| Parameters | Type | Range |
| --- | --- | --- |
| Calibration List Type | UCHAR | 0 to 1 |
| Forward Link Calibration Record | Ncf × 8-byte field | see below |
| Reverse Link Calibration Included | UCHAR | 0 to 1 |
| Reverse Link Calibration Record | Ncr × 8-byte field | see below |

Calibration information is provided in different forms for different protocol types. For Protocol Type 1 or 2 (synchronous CDMA), the calibration information accounts for residual GPS time synchronization error at the base station described by the BSA record, which is the residual error between the timing of the base station and GPS timing. For Protocol Type 4 (GSM) and 8 (W-CDMA), the calibration information provides the relationship between GPS time and the channel frame structure for the base station.

Table 12 shows an embodiment of a CDMA Forward Link Calibration record for Protocol Type 1 and 2. The Num FLCs field indicates the number of forward link calibration values (Ncf) included in the calibration record. The calibration record then includes Ncf forward link calibration values for the Nf frequencies, where Ncf=1 or Nf depending on the Calibration Type value. Each forward link calibration value describes the estimated error of the forward link timing (which is associated with the base station's transmitter unit) and is given in units of meters. The Uncertainty field describes the uncertainty in the forward link calibration value and is also given in units of meters. The uncertainty value is within a range of 1 to 65534, with the values of 0 and 65535 being reserved to indicate an invalid calibration. In general, calibration uncertainty is dependent on the particular calibration procedure used to obtain the calibration value. The calibration uncertainty may be interpreted as the 1-sigma confidence value, which means that there is 68.3% probability that the actual base station timing error will be less than the uncertainty value. The units for both calibration and calibration uncertainty are given in units of meters, which is different from the units used for these parameters in Format Type 0 and 1.

TABLE 12

CDMA Forward Link Calibration Record

| Name | Fields | Type | Range | Units |
| --- | --- | --- | --- | --- |
| NumFLCs (Ncf) | Number of forward link calibration values | UCHAR | 0 to 50 | |
| Ncf occurrences of the following fields | | | | |
| FwdLinkCal1 | Forward Link Calibration | FLOAT | −30000 to +30000 | Meters |
| FwdLinkCal2 | Uncertainty | UINT2 | 1 to 65534 | Meters |
| FwdLinkCal3 | Spare | UINT2 | set to 0 | |
| FwdLinkCal4 | Spare | UINT2 | set to 0 | |

In Table 12, a FLOAT is a 32-bit single-precision floating-point value. The forward link calibration data may be obtained based on on-site empirical measurements. The Forward Link Calibration field may be set to 0 and the Uncertainty field may be set to 300 as default values. It has been observed that these default values vary from vendor to vendor.

When a cellular measurement is obtained by a terminal for a base station, the applicable forward link calibration value is retrieved from the BSA database and subtracted from the cellular measurement. The resultant value may then be used to compute a position estimate for the terminal.

Table 13 shows an embodiment of a CDMA Reverse Link Calibration record for Protocol Type 1 and 2. The Num RLCs field indicates the number of reverse link calibration values (Ncr) included in the calibration record. The calibration record then includes Ncr reverse link calibration values for the Nf frequencies. Each reverse link calibration value describes the estimated error of the reverse link timing (which is associated with the base station's receiver unit) and is given in units of meters. The reverse link timing may be quantified by round trip delay (RTD) or some other measurement. The Uncertainty field describes the uncertainty in the reverse link calibration value and is also given in units of meters.

TABLE 13

CDMA Reverse Link Calibration Record

| Name | Fields | Type | Range | Units |
|---|---|---|---|---|
| NumRLCs (Ncr) | Number of reverse link calibration values | UCHAR | 0 to 50 | |
| Ncr occurrences of the following fields | | | | |
| RevLinkCal1 | Reverse Link Calibration | FLOAT | −30000 to +30000 | Meters |
| RevLinkCal2 | Uncertainty | UINT2 | 1 to 65534 | Meters |

The reverse link calibration data may be obtained based on on-site empirical measurements. The Reverse Link Calibration field may be set to 0 and the Uncertainty field may be set to 300 as default values. Since some systems do not support round trip delay measurement usage, the NumRLCs field may be set to 0.

For Protocol Type 4 (GSM), framing information (applicable at the reference GPS time) may be provided for the forward link, and timing advance (TA) may be provided for the reverse link. Table 14 shows an embodiment of a GSM Forward Link Calibration record. This record includes Ncf forward link calibration values for the Nf frequencies. For each forward link calibration value, the FNm, TN, and BN fields collectively describe the phase information for the GSM cell described by the BSA record. This phase information is for the GSM framing information for the GSM cell at the reference time given in the Time Reference field. The FNm field stores the frame number for the GSM cell at the reference time. It should be noted that a time precision extension or other external phase information is needed to achieve sufficient precision. The TN field stores the time slot within the frame for the GSM cell at the reference time. The BN field stores the bit number within the time slot for the GSM cell at the reference time. The FNm, TN, and BN values may be obtained from empirical measurement taken from a Location Measurement Unit (LMU) or similar time synchronization source. The Uncertainty field describes the uncertainty in the forward link calibration value and is given in units of meters. The Uncertainty value is greater than 0, with the value of 0 being reserved to indicate an invalid calibration.

TABLE 14

GSM Forward Link Calibration Record

| Name | Fields | Type | Range | Units |
|---|---|---|---|---|
| NumFLCs (Ncf) | Number of forward link calibration values | UCHAR | 0 to 50 | |
| Ncf occurrences of the following fields | | | | |
| FwdLinkCal1 | FNm | FLOAT | 0 to $(2^{21} - 1)$ | Frames |
| FwdLinkCal2 | TN | UINT2 | 0 to 7 | Time slots |
| FwdLinkCal3 | BN | UINT2 | 0 to 156 | Bits |
| FwdLinkCal4 | Uncertainty | UINT2 | 1 to 65536 | Meters |

A GSM Reverse Link Calibration record may include the fields shown in Table 13 for the CDMA Reverse Link Calibration record. The Reverse Link Calibration field contains a value for the round trip time (RTT) or timing advance.

The Optional Fields Mask field allows a BSA record to include optional fields. The optional field mechanism and capability provide flexibility to support a variety of protocols, different transmitter types, and future upgrades to the base station almanac. The Optional Fields Mask field can be implemented as a bit mask, with each optional field being assigned to a different bit of the bit mask. A bit in the bit mask is set to 1 if the associated optional field is included in the BSA record and is set to 0 otherwise. Table 15 shows an exemplary assignment of the bits in the 32-bit Optional Fields Mask field to the optional fields.

TABLE 15

Optional Fields Mask Assignment

| Optional Field Name | Mask Value |
|---|---|
| CDMA Transmit PN and Increment | 0x00000001 |
| Sector Center Information | 0x00000002 |
| Air Interface Information | 0x00000004 |
| Time Reference Extension | 0x00000008 |
| Future Expansion | 0x00000010 |

The mask values in Table 15 are given in hexadecimal. Each of the optional fields in Table 15 is described below.

The CDMA Transmit PN and Increment field may be used for Protocol Type 1 and 2 (CDMA) and 8 (W-CDMA). Table 16 shows an embodiment of this field, which includes a CDMA Transmit PN subfield and a CDMA PN Increment subfield.

TABLE 16

CDMA Transmit PN and Increment Field

| Subfields | Type | Range |
|---|---|---|
| CDMA Transmit PN | UINT2 | 0 to 511 |
| CDMA PN Increment | UCHAR | 1 to 8 |

The CDMA Transmit PN subfield contains the PN offset assigned to the sector. For IS-95 and IS-2000 CDMA networks, each sector is assigned a specific offset of a PN sequence used to spectrally spread data prior to transmission over the forward link. All sectors use the same 32,768-chip PN sequence for spectral spreading. However, the PN sequence for each sector starts at a specific time relative to a known reference time. The PN offset refers to the phase of the PN sequence at the known reference time. Since neighboring sectors are assigned different PN offsets, the PN sequence can be used to identify the source of a cellular signal received by a terminal.

The CDMA PN Increment subfield indicates the highest common factor for the PN offset of the sector described by the BSA record and the PN offsets of neighboring sectors that are on the same frequency. Many CDMA networks use a fixed PN increment of 1, 2, 3, or 4, where a PN increment value of one denotes a minimum separation of 64 chips among the PN sequences used by the sectors. The highest possible common PN increment value should be used for sectors near the boundary of two CDMA networks because a terminal may receive signals from sectors in neighboring networks. In CDMA networks where the PN increment may be smaller than 3, care should be taken to make this parameter reasonably accurate, based on network layout. The PDE uses the PN increment to resolve potential ambiguities in the sources of the signals received from neighboring sectors in the same general vicinity. If the PN increment is set too small (e.g., to 1), then the PDE may not be able to ascertain the source of a signal with sufficient certainty and the measurement may be thrown out. Conversely, if the PN increment is too large, then the PDE may associate a received pilot phase measurement with the wrong PN offset or an ambiguity may be observed.

The CDMA transmit PN and CDMA PN increment are described in TIA/EIA/IS-95 and IS-95B. The values for the CDMA Transmit PN and CDMA PN Increment subfields are available through Wireless Operator Cellular Network Planning specifications.

The Sector Center Information field contains information describing the center of the sector. The sector center represents the centroid of all expected terminal positions within the sector. Table 17 shows an embodiment of the Sector Center Information field.

TABLE 17

Sector Center Information Field

| Subfields | Type | Range | Units |
|---|---|---|---|
| Sector Center Latitude | DOUBLE | −90 to +90 | Degrees (decimal) |
| Sector Center Longitude | DOUBLE | −180 to +180 | Degrees (decimal) |
| Sector Center Altitude (HAE) | INT2 | −1000 to +10000 | Meters |

The sector center is described with a latitude, a longitude, and an altitude (height above ellipsoid), where all three parameters may be given using WGS-84. The latitude and longitude are each described with a DOUBLE, which is a 64-bit double-precision floating-point value.

The sector center may be explicitly provided in the Sector Center Information field. Alternatively, the sector center may be computed based on the following parameters: antenna latitude, antenna longitude, antenna altitude, antenna orientation, antenna opening, and maximum antenna range, all of which are provided in the antenna-related fields of the BSA record. In one exemplary computation method, the sector center is determined by projecting the antenna position along a vector defined by the antenna orientation (as shown in FIG. 3) to a distance of Dc, as follows:

$$Dc = \frac{MAR}{4} \times \operatorname{sinc}\left(\frac{\text{antenna opening}}{2}\right), \quad \text{Eq (1)}$$

where sinc (x)=sin(x)/x. The PDE may compute the sector center as shown in equation (1) if the BSA record does not include the Sector Center Information field.

The sector center may be used in various manners for position determination. For example, the sector center may be provided directly as an initial position estimate for a terminal. The sector center for the sector described by the BSA record may also be combined with sector centers for other sectors to obtain a mixed sector center, which may be provided as the initial position estimate for the terminal. In any case, the initial position estimate may be used to provide aiding information for the terminal, which can reduce the search space for GPS signals. A final position estimate for the terminal may be computed based on measurements obtained from GPS satellites and/or base stations.

The sector center may also be used as a starting point for an iterative position determination algorithm. The algorithm may initially estimate the position of a terminal to be at the sector center. The algorithm may thereafter iterate the terminal position with GPS and/or cellular measurements to obtain the final position estimate for the terminal. The sector center may further be used as the bounds for the final position estimate computed based on GPS and/or cellular measurements. The sector center may also be used to obtain the final position estimate for the terminal if a measurement-based position estimate cannot be obtained (e.g., because an insufficient number of cellular measurements is available) or if the measurement-based position estimate fails (e.g., because of an erroneous measurement).

The Air Interface Information field contains air interface information that may be used by the PDE to better model system performance and is related to the MAR parameters. This information may be provided as a reference and clarification to the MAR data or as a replacement for the MAR data. Table 18 shows an embodiment of the Air Interface Information field.

TABLE 18

Air Interface Information Field

| Subfields | Type | Range | Units |
|---|---|---|---|
| Land Use Code | UCHAR | 0 to 11 (see Table 19) | |
| Transmission Power | CHAR | −128 to +127 | dBm |
| Antenna Gain | UCHAR | 0 to 255 | dBi |

The Land Use Code subfield indicates the environment of the sector. This information is used to model RF propagation.

Table 19 shows an exemplary assignment of codes to different land use types.

TABLE 19

Land Use Code Assignment

| Land Use Description | Code |
|---|---|
| Not provided | 0 |
| Water | 1 |
| Open area | 2 |

TABLE 19-continued

Land Use Code Assignment

| Land Use Description | Code |
|---|---|
| Open with some obstructions | 3 |
| Forest, low density | 4 |
| Forest, high density | 5 |
| Suburban, low density | 6 |
| Suburban, low density with dense vegetation | 7 |
| Suburban, provincial town | 8 |
| Urban areas, low density | 9 |
| Urban areas | 10 |
| Urban areas, high density | 11 |

The Transmission Power subfield indicates the transmit power of the sector antenna. The Antenna Gain subfield indicates the antenna gain for the sector. The transmission power and antenna gain are used to model RF propagation.

The Time Reference Extension field contains millisecond timing information for the time given in the Time Reference field. The Time Reference field gives the specific GPS second within a GPS week, and the Time Reference Extension field gives the specific millisecond within the GPS second. More accurate timing information may be needed, for example, for the calibration information for the forward and reverse links in GSM.

The Future Expansion field contains additional records that may be defined for additional capability. Table 20 shows an embodiment of the Future Expansion field.

TABLE 20

Future Expansion Field

| Subfields | Type | Range | Units |
|---|---|---|---|
| Field Length (Nr) | UCHAR | 0 to 255 | Bytes |
| Nr occurrences of the following subfields | | | |
| Subfield Number | UCHAR | 0 to 255 | |
| Subfield Length | UCHAR | 0 to 255 | Bytes |
| Subfield Data | Variable | | |

The Field Length subfield indicates the number of records (Nr) being included in the Future Expansion field, where $Nr \geq 0$. Nr records then follow the Field Length subfield. Each record includes a Subfield Number subfield that indicates the record number, a Subfield Length subfield that indicates the length of the data portion of the record, and a Subfield Data subfield that carries the data for the record. The Subfield Data subfield has a variable length that is determined by the Subfield Length value.

Table 20 shows an implementation of two additional optional fields using the Optional Fields mechanism. These two fields may be used for internal PDE communication (e.g., between the BSA database server and the LCS server in FIG. 1). The mask values for these internal fields are defined using the two MSBs, which is opposite from the four LSBs used for the optional fields shown in Table 15.

TABLE 21

Optional Fields

| Fields | Type | Optional Fields Mask Value |
|---|---|---|
| Last Serving Time | 6-Byte field | 0x80000000 |
| Last Measurement Time | 6-Byte field | 0x40000000 |

The Last Serving Time field indicates the last time a sector is observed to have served a terminal. The Last Measurement Time field indicates the last time the terminal provided a ranging measurement from the sector. The time in these two fields may be given using the GPS time format shown in Table 9.

The base station almanac may be constructed using a traditional file format (bts), a comma-separated values file format (csv), or a tab-separated values file format (tsv). For the tsv file format, the first line of the base station almanac contains the column headings, separated by tabs. The body of the almanac then follows, one BSA record on each line, with the fields of each BSA record separated by tabs. Data is interpreted based on its position in the list of tab-separated fields. The order is thus important.

Multiple BSA records are typically sent across an interface between two network entities. Table 22 shows an embodiment of a BSA collection that includes multiple BSA records.

TABLE 22

BSA Collection

| Name | Type | Range | Units |
|---|---|---|---|
| Number of Records (Nrec) | UCHAR | 0 to 255 | |
| Total Data Length | UINT2 | 0 to 65535 | Bytes |
| Nrec occurrences of the following | | | |
| Record Length | UINT2 | 0 to 65535 | Bytes |
| BSA Record | | see Table 2 | |

The Number of Records field indicates the number of BSA records (Nrec) being included in the BSA collection, where $Nrec \geq 0$. The Total Data Length field indicates the total length of all data to follow for the Record Length and BSA records. Nrec occurrences of Record Length field and BSA record then follow the Total Data Length field. For each such occurrence, the Record Length parameter indicates the length of the accompanying BSA record, and the BSA record follows after Record Length field. More than 255 BSA records may be sent via multiple BSA collections.

Figure 4:
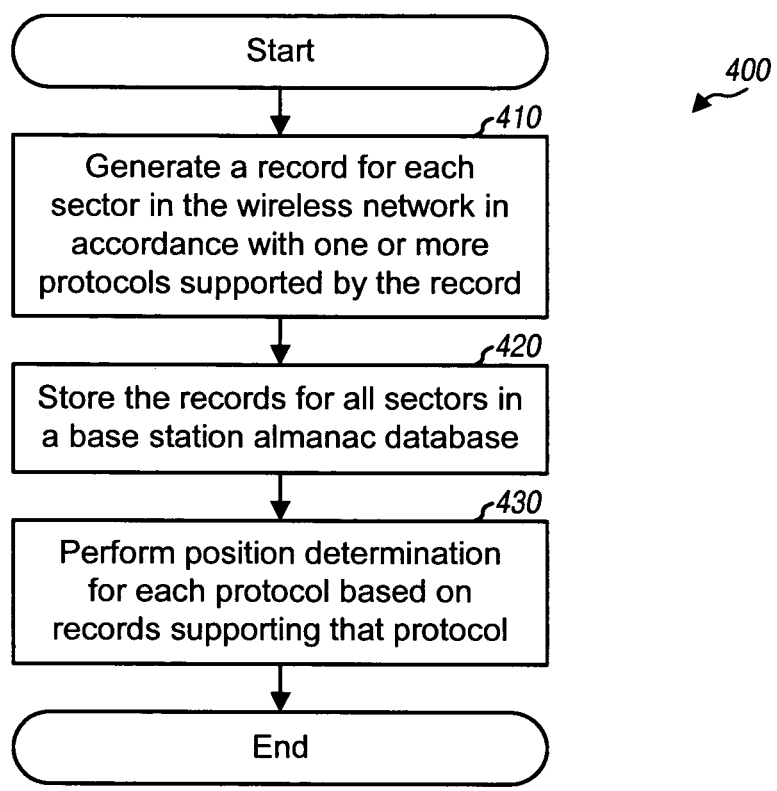
FIG. 4 shows an overall process for generating and using a base station almanac for position determination.

FIG. 4 shows a flow diagram of an overall process 400 for generating and using a base station almanac for position determination in a wireless communication network. Initially, a BSA record is generated for each sector or transmitter for which position determination is supported (step 410). The wireless network may include sectors/transmitters for which no data is available for position determination, in which case no records are generated for these sectors/transmitters. Each BSA record is generated in accordance with the one or more protocol(s) supported by the record. The records for all sectors/transmitters are stored in a base station almanac database (step 420). The base station almanac may support multiple protocols such as IS-801, J-STD-36, GSM, W-CDMA, and so on. Position determination is performed for each protocol based on the records supporting that protocol (step 430). For example, for a wireless terminal in a wireless network that supports IS-801, only records supporting IS-801 are considered for position determination for that terminal.

Steps 410, 420, and 430 may be performed on a continual basis. New BSA records are generated as sectors and transmitters are added to the base station almanac, old BSA records are purged as they become obsolete, and existing BSA records are updated (e.g., replaced with new BSA records) as more accurate data becomes available for the sectors/transmitters.

Figure 5:
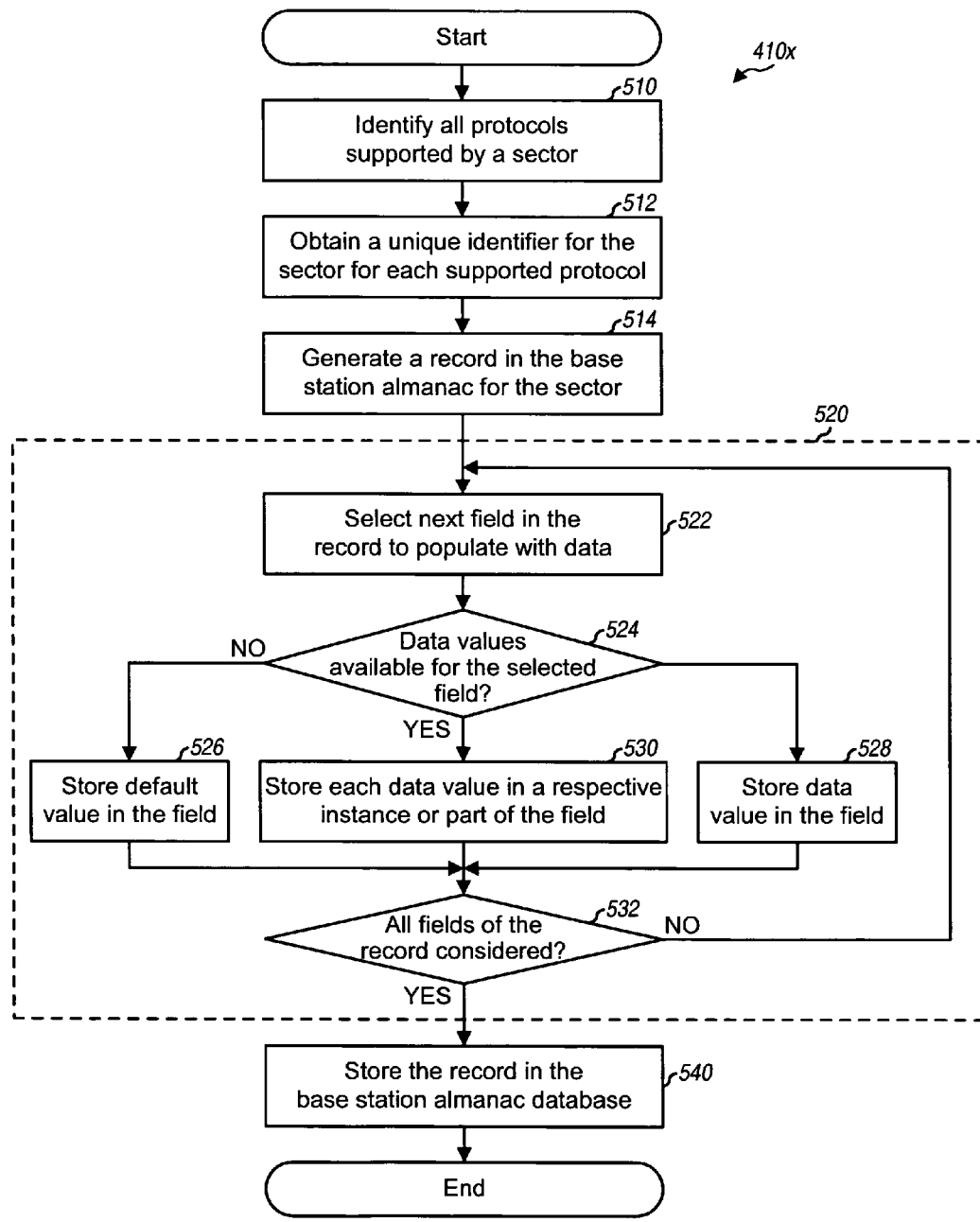
FIG. 5 shows a process for generating and storing a BSA record for a sector.

FIG. 5 shows a flow diagram of a process 410x for generating and storing a BSA record for a sector. Process 410x may be used for steps 410 and 420 in FIG. 4 for one BSA record. Initially, all protocols supported by the sector are determined, e.g., based on information available from the network operator (step 510). A unique identifier for the sector is obtained for each supported protocol (step 512). If the sector supports multiple protocols, then multiple identifiers are obtained for the sector. A record is then generated for the sector (step 514).

The fields of the record for the sector are then populated with appropriate data (block 520). The first field in the record is selected (522). For the BSA record described above, a field may include multiple subfields and/or subrecords that may be populated with different values. However, for simplicity, each field is described below as having one data value. A determination is made whether there are any data values available for the selected field (step 524). If the answer is 'no', then a default value is stored in the field (step 526). If one data value is available for the selected field, then the data value is stored in the field (step 528). If multiple data values are available, then each data value is stored in a respective instance or part of the field (step 530). For example, multiple sector identifiers may be stored in multiple instances of the Unique Sector Identification field, multiple MARs and their associated reference power levels may be stored in multiple sets of subfields in the MAR Information field, multiple frequencies may be stored in different parts of the Frequency List field, and multiple calibration values may also be stored in the Frequency List field.

After steps 526, 528, and 530, a determination is made whether or not all fields of the record have been considered (step 532). If the answer is 'no, then the process returns to step 522 to select the next field to populate with data. Otherwise, if all fields have been considered, then the record is stored in the base station almanac database (step 540) and the process terminates.

Figure 6:
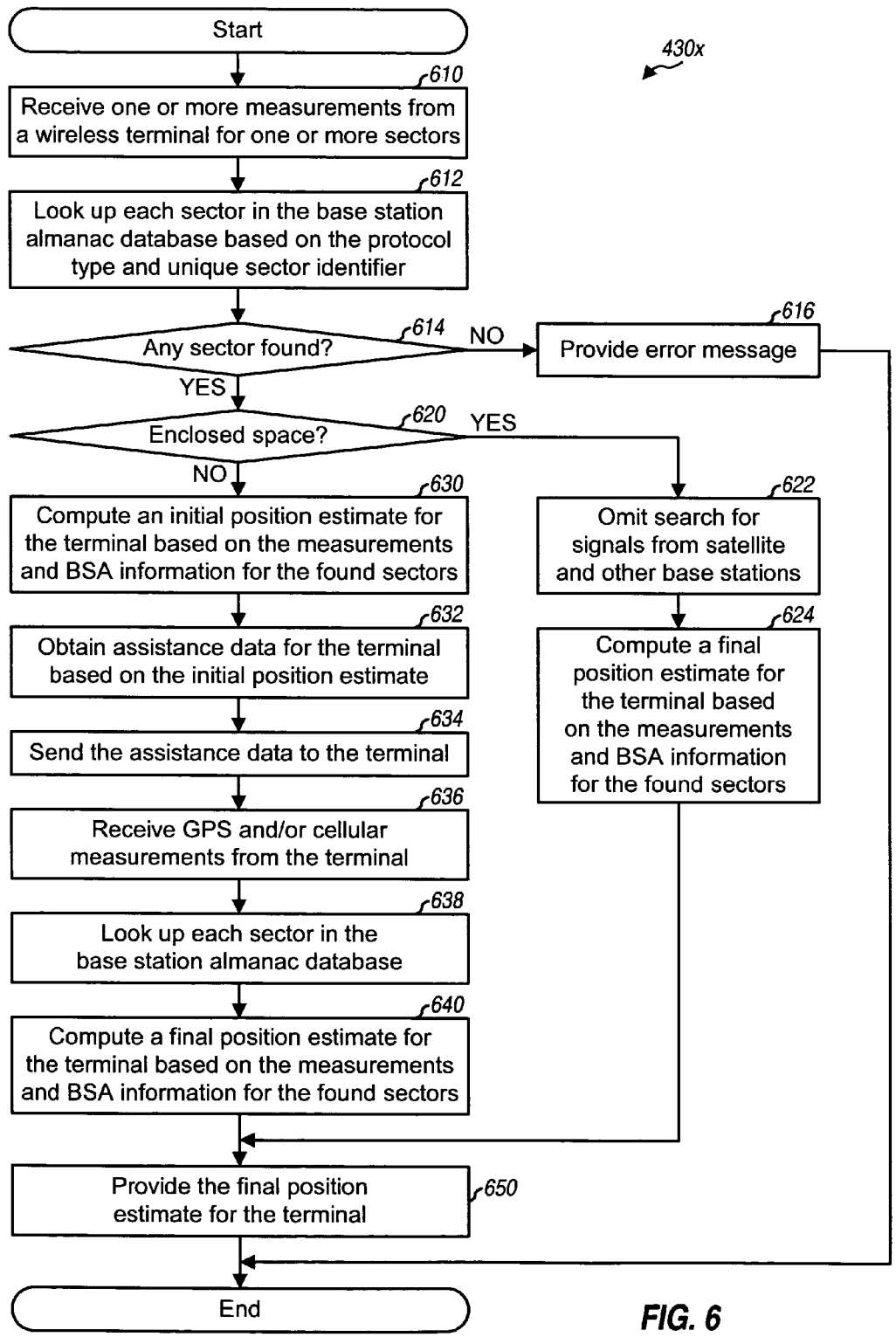
FIG. 6 shows a process for performing position determination for a wireless terminal using the base station almanac.

FIG. 6 shows a flow diagram of a process 430x for performing position determination for a wireless terminal using the base station almanac described herein. Process 430x may be used for step 430 in FIG. 4 and may be performed by the PDE.

Initially, the PDE receives one or more measurements from the terminal for one or more sectors (step 610). These measurements may be indicative of ranges to the sectors, received signal strength, PN phases for the sectors, and so on. The PDE also receives the identifier for each sector, as determined by the terminal based on the signal or messages received from the sector. The PDE looks up each sector in the base station almanac database based on the protocol type and sector identifier (step 612). Different protocols use different identification fields for describing the sector identifier, and only records supporting the applicable protocol are evaluated in the lookup.

A determination is then made whether or not any of the sectors received by the terminal was found in the base station almanac database (step 614). If the answer is 'no', then the PDE provides an error message indicating that the sectors received by the terminal cannot be found (step 616), and the process then terminates. If a sector is found in step 614, then a determination is made whether the found sector is associated with an enclosed environment based on the Enclosed Space Indicator field of the record for this sector (step 620). If the answer is 'yes', then the search for GPS signals and other base station signals is omitted (step 622). The PDE then computes a final position estimate for the terminal using the best position determination method available (e.g., from among the ones shown in Table 1) and the BSA information for the found sector(s) (step 624). For example, the PDE may compute the final position estimate using (1) the A-FLT method if a sufficient number of cellular measurements are available, (2) the enhanced cell-ID method if range and/or signal strength measurements are available, or (3) the cell-ID method if no additional information is available. The A-FLT method may be aided with terrain height information, calibration information, and so on, as described above. The enhanced cell-ID method may utilize received signal strength to select an appropriate MAR, as also described above. The process then proceeds to step 650.

If no sector is associated with an enclosed environment, as determined in step 620, then the PDE computes an initial position estimate for the terminal based on the measurements from the terminal and BSA information (e.g., MARs, sector coverage areas, and so on) for the found sector(s) (step 630). The PDE may perform step 630 in the same manner described above for step 624. The PDE then obtains assistance data for the terminal based on the initial position estimate (step 632). The assistance data may include (1) acquisition assistance data that can be used by the terminal to search for GPS satellites and/or (2) sensitivity assistance data that can be used by the terminal to improve the detection of GPS signals. The PDE sends the assistance data to the terminal (step 634).

The PDE thereafter receives GPS and/or cellular measurements from the terminal (step 636). The PDE looks up the base station almanac database for the sectors corresponding to the cellular measurements (step 638) and computes the final position estimate for the terminal using the best position determination method available (step 640). For example, the PDE may compute the final position estimate using the GPS method if a sufficient number of GPS measurements are available or the A-FLT method if a sufficient number of GPS and cellular measurements are available.

After steps 624 and 640, the PDE provides the final position estimate for the terminal. The process then terminates.

Figure 7:
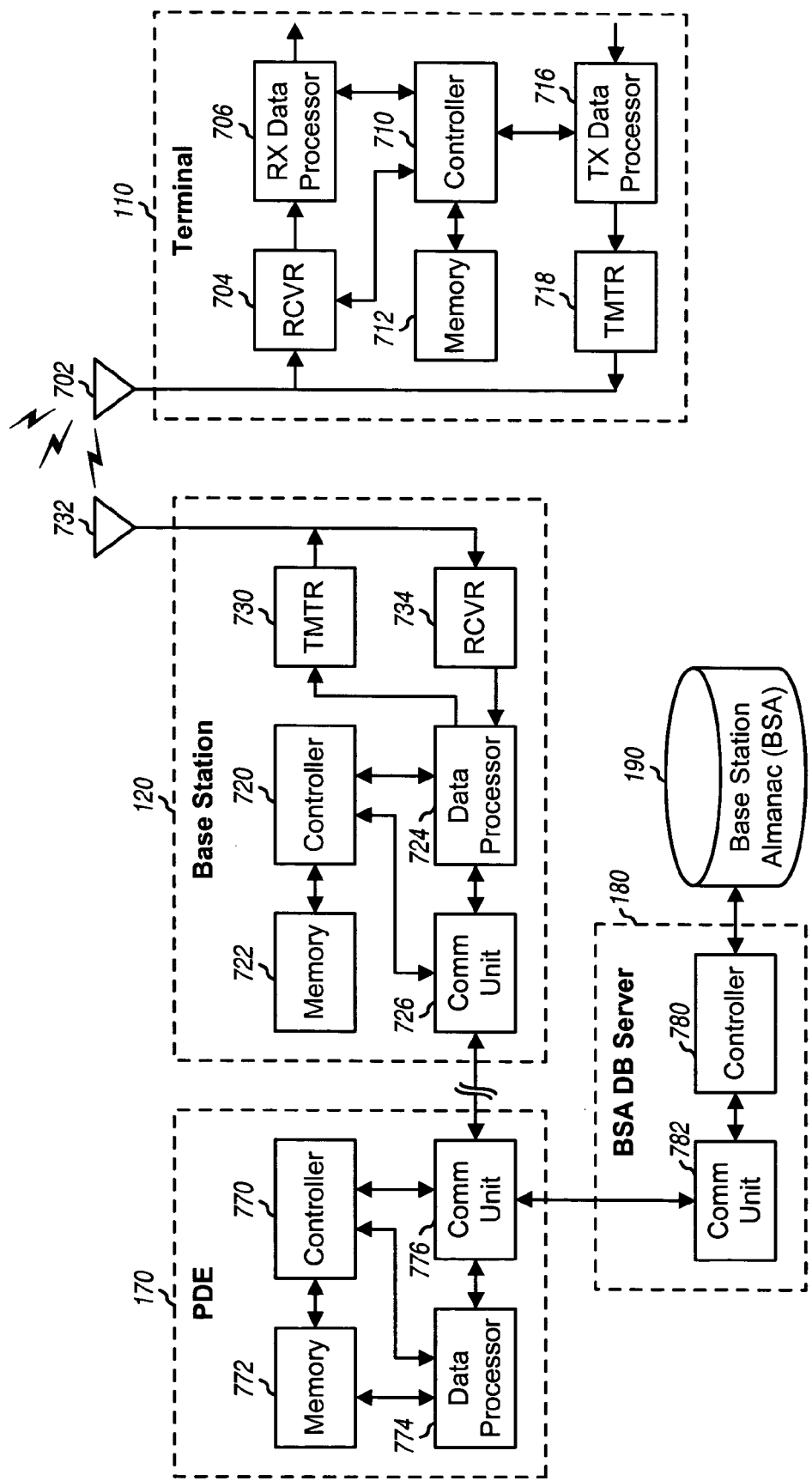
FIG. 7 shows a block diagram of various network entities within the cellular communication network in FIG. 1.

FIG. 7 shows a block diagram of various network entities within cellular network 100. For simplicity, MSC 140 is not shown in FIG. 7, and base station 120 is shown operatively coupled to PDE 170. Base station 120 is one of the base stations in cellular network 100.

On the forward link, base station 120 transmits data, pilot, and signaling to the terminals within its coverage area. A data processor 724 processes (e.g., formats, encodes, and modulates) the various types of data, and a transmitter unit (TMTR) 730 further conditions (e.g., filters, amplifies, quadrature modulates, and upconverts) the processed data to obtain a forward link signal, which is then transmitted via an antenna 732 to the terminals. Terminal 110 receives forward link signals from one or more base stations (including base station 120) at an antenna 702. A receiver unit (RCVR) 704 receives and processes the receiver input signal from antenna 702, which may include received signals for one or more base stations. Receiver unit 704 provides various measurements (e.g., time of arrival and/or received signal strength) that may be used for sector identification and position determination. A receive (RX) data processor 706 further processes (e.g., demodulates and decodes) each received signal to obtain the identification information for the source of the received signal.

On the reverse link, terminal 110 may transmit data, pilot, and/or signaling to a "serving" base station, which for this case may be base station 120. A transmit (TX) data processor 716 processes the various types of data, and a transmitter unit 718 further conditions the processed data to obtain a reverse link signal, which is then transmitted via antenna 702. Base station 120 receives the reverse link signal from terminal 110 at antenna 732. A receiver unit 734 conditions the receiver input signal, and a data processor 724 processes the conditioned signal to obtain data transmitted by terminal 110, which may then be provided to a controller 720. Base station 120 communicates with PDE 170 via a communication (Comm) unit 726.

PDE 170 communicates with base station 120 and BSA database server 180 via a communication unit 776. A controller 770 performs various functions for position determination such as requesting base station almanac data from BSA database server 180, deriving an initial position estimate and/or a final position estimate for a wireless terminal, determining assistance data for the wireless terminal, and so on. For example, controller 770 may perform the process shown in FIG. 6 and take part in the processes shown in FIGS. 4 and 5. A data processor 774 generates messages exchanged between PDE 170 and other network entities.

BSA database server 180 communicates with PDE via a communication unit 782. A controller 780 manages the base station almanac stored in storage unit 190, retrieves BSA records from database 190 as requested by PDE 170, and provides the retrieved BSA records to PDE 170. BSA database server 180 may include a user interface (not shown in FIG. 7) to support generation and modification of BSA records. BSA database server 180 may implement the process shown in FIG. 5 and take part in the processes shown in FIGS. 4 and 6. BSA database server 180 and storage unit 190 may also be implemented as parts of PDE 170.

Controllers 710, 720, 770, and 780 perform various processing and control functions for terminal 110, base station 120, PDE 170, and BSA database server 180, respectively. Memory units 712, 722, and 772 store program codes and data for controllers 710, 720, and 770, respectively.

The method and apparatus described herein may be implemented by various means, such as in hardware, software, or a combination thereof. For a hardware implementation, the method and apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method described herein may be implemented with modules (e.g., procedures, functions, and so on) that perform the functions described herein. The software codes may be stored in a memory unit (e.g., memory unit 712 or 772 in FIG. 7) and executed by a processor (e.g., controller 710 or 770). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of using a base station almanac for position determination in a wireless communication network, comprising:

storing, in a single record of the base station almanac, at least two data values for a single attribute of a single transmitting entity, wherein each of the at least two data values is stored in a respective instance or part of a field in the single record of the single transmitting entity; and using the at least two data values in the field of the record for position determination for wireless terminals in the wireless communication network.

2. The method of claim 1, wherein the at least two data values are for at least two identifiers for the single transmitting entity.

3. The method of claim 1, wherein the at least two data values are for a function used to estimate coverage area of the single transmitting entity.

4. The method of claim 1, wherein the at least two data values are for at least two maximum antenna ranges (MARs) for the single transmitting entity.

5. The method of claim 1, wherein the at least two data values are for at least two frequencies used by the single transmitting entity.

6. The method of claim 5, wherein the record further includes a calibration value for each of the at least two frequencies.

7. The method of claim 1, further comprising:
storing, in a single entry of the single record, attributes for the at least two data values.

8. A method of using a base station almanac for position determination in a wireless communication network, comprising:

storing, in a single record of the base station almanac, at least two maximum antenna ranges (MARs) for a single transmitting entity associated with the single record wherein each of the at least two MARs is associated with a respective reference power level, and wherein each MAR is indicative of a geographic area within which a wireless terminal is expected to be located if received signal strength measured by the wireless terminal for the single transmitting entity meets or exceeds the reference power level associated with the MAR; and using the at least two MARs for position determination for wireless terminals in the wireless communication network.

9. The method of claim 8, further comprising:
obtaining an estimated MAR based on the at least two MARs, wherein the estimated MAR is used for position determination.

10. The method of claim 9, further comprising:
selecting one of the at least two MARs based on received signal strength measured by a wireless terminal for the single transmitting entity, wherein the estimated MAR is equal to the selected MAR.

11. The method of claim 9, wherein the estimated MAR is obtained by interpolating between the at least two MARs.

12. The method of claim 9, wherein the estimated MAR is obtained by curve fitting the at least two MARs.

13. The method of claim 9, further comprising:
estimating a coverage area for the transmitting entity based on the estimated MAR.

14. The method of claim 9, further comprising:
deriving a position estimate for the wireless terminal based on the estimated MAR.

15. The method of claim 9, further comprising:
providing assistance data for the wireless terminal based on the estimated MAR, wherein the assistance data is used by the wireless terminal to search for and process satellite signals.

16. A method of using a base station almanac for position determination in a wireless communication network, comprising:
- storing an enclosed space indicator for each of a plurality of records of the base station almanac, wherein the enclosed space indicator for each record indicates whether a transmitting entity described by the record is associated with an enclosed environment; and
- using the enclosed space indicators for the plurality of records for position determination of a wireless terminal in a wireless communication network by selectively omitting a search for satellite signals based upon whether the enclosed space indicator for a given record among the plurality of records indicates an enclosed environment for a given transmitting entity associated with the wireless terminal.

17. The method of claim 16, further comprising:
- identifying the given transmitting entity for a signal received by the wireless terminal;
- retrieving the given record in the base station almanac for the given transmitting entity; and
- performing position determination for the wireless terminal using the enclosed space indicator for the retrieved record.

18. The method of claim 17, further comprising:
- reporting the wireless terminal to be in an enclosed environment if indicated by the enclosed space indicator for the retrieved record.

19. A position determination system comprising:
- a storage unit for storing an enclosed space indicator for each of a plurality of records of the base station almanac, wherein the enclosed space indicator for each record indicates whether a transmitting entity described by the record is associated with an enclosed environment; and
- a controller operative to use the enclosed space indicators for the plurality of records for position determination of a wireless terminal in a wireless communication network by selectively omitting a search for satellite signals based upon whether the enclosed space indicator for a given record among the plurality of records indicates an enclosed environment for a given transmitting entity associated with the wireless terminal.

20. A position determination system configured to use a base station almanac for position determination in a wireless communication network, comprising:
- a storage unit configured to store, in a single record of the base station almanac, at least two data values for a single attribute of a single transmitting entity, wherein each of the at least two data values is stored in a respective instance or part of a field in the single record of the single transmitting entity; and
- a controller configured to use the at least two data values in the field of the record for position determination for wireless terminals in the wireless communication network.

21. A position determination system configured to use a base station almanac for position determination in a wireless communication network, comprising:
- means for storing, in a single record of the base station almanac, at least two data values for a single attribute of a single transmitting entity, wherein each of the at least two data values is stored in a respective instance or part of a field in the single record of the single transmitting entity; and
- means for using the at least two data values in the field of the record for position determination for wireless terminals in the wireless communication network.

22. A non-transitory computer-readable medium containing instructions stored thereon, which, when executed by a position determination system configured to use a base station almanac for position determination in a wireless communication network, cause the position determination system to perform actions, the instructions comprising:
- program code to store, in a single record of the base station almanac, at least two data values for a single attribute of a single transmitting entity, wherein each of the at least two data values is stored in a respective instance or part of a field in the single record of the single transmitting entity; and
- program code to use the at least two data values in the field of the record for position determination for wireless terminals in the wireless communication network.

23. A position determination system comprising:
- means for storing an enclosed space indicator for each of a plurality of records of the base station almanac, wherein the enclosed space indicator for each record indicates whether a transmitting entity described by the record is associated with an enclosed environment; and
- means for using the enclosed space indicators for the plurality of records for position determination of a wireless terminal in a wireless communication network by selectively omitting a search for satellite signals based upon whether the enclosed space indicator for a given record among the plurality of records indicates an enclosed environment for a given transmitting entity associated with the wireless terminal.

24. A non-transitory computer-readable medium containing instructions stored thereon, which, when executed by a position determination system configured to use a base station almanac for position determination in a wireless communication network, cause the position determination system to perform actions, the instructions comprising:
- program code to store an enclosed space indicator for each of a plurality of records of the base station almanac, wherein the enclosed space indicator for each record indicates whether a transmitting entity described by the record is associated with an enclosed environment; and
- program code to use the enclosed space indicators for the plurality of records for position determination of a wireless terminal in a wireless communication network by selectively omitting a search for satellite signals based upon whether the enclosed space indicator for a given record among the plurality of records indicates an enclosed environment for a given transmitting entity associated with the wireless terminal.

* * * * *